US012792725B2

(12) United States Patent
Sawant et al.

(10) Patent No.: US 12,792,725 B2
(45) Date of Patent: Nov. 10, 2026

(54) APPLICATION SERVER PROTECTION BY MAINTAINING CROSS-SESSION INSPECTION CONTEXT

(71) Applicant: Zscaler, Inc., San Jose, CA (US)

(72) Inventors: Digambar Sawant, Bengaluru (IN); Dejan Mihajlovic, Sunnyvale, CA (US); Anurag Raghuvanshi, Bengaluru (IN); Monica Bhaskaran, Bengaluru (IN); A B M Kowser Patwary, Mountain View, CA (US)

(73) Assignee: Zscaler, Inc., Santa Clara, CA (US)

( * ) Notice: Subject to any disclaimer, the term of this patent is extended or adjusted under 35 U.S.C. 154(b) by 190 days.

(21) Appl. No.: 18/346,411

(22) Filed: Jul. 3, 2023

(65) Prior Publication Data

US 2024/0386098 A1 Nov. 21, 2024

(30) Foreign Application Priority Data

May 17, 2023 (IN) ............................. 202311034602

(51) Int. Cl.
*G06F 21/55* (2013.01)

(52) U.S. Cl.
CPC .................................. *G06F 21/552* (2013.01)

(58) Field of Classification Search
None
See application file for complete search history.

(56) References Cited

U.S. PATENT DOCUMENTS 8,516,586 B1 * 8/2013 Jensen ................ H04L 63/1425 713/153
8,607,066 B1 * 12/2013 Kailash ............... H04L 63/1441 713/188
8,782,790 B1 * 7/2014 Smith ................ H04L 63/1441 726/24
8,935,788 B1 * 1/2015 Diao ..................... G06F 21/564 726/24
9,460,274 B1 10/2016 Varanasi et al.
10,200,384 B1 * 2/2019 Mushtaq ................ H04L 67/02
10,218,740 B1 * 2/2019 Mesdaq ................ H04L 63/145
10,375,024 B2 8/2019 Foxhoven et al.
10,419,449 B1 * 9/2019 Agranonik .......... H04L 63/1441
10,616,180 B2 4/2020 Chanak et al.
11,356,448 B1 6/2022 Varanasi et al.
2012/0173702 A1 * 7/2012 Szabo .................. H04L 67/535 709/224
2017/0310709 A1 10/2017 Foxhoven et al.
2018/0270201 A1 9/2018 Chanak et al.

(Continued)

*Primary Examiner* — Philip J Chea
*Assistant Examiner* — Bon Qing Zheng
(74) *Attorney, Agent, or Firm* — Baratta Law PLLC; Lawrence A. Baratta, Jr.; Ryan Odessa

(57) ABSTRACT

Systems and methods are presented to provide application server protection by maintaining cross-session inspection context. In an embodiment, steps include monitoring user traffic in a cloud-based system; performing an inspection of the user traffic to determine if the user traffic includes malicious content; assigning a label to content of the user traffic, the label identifying the content as having any of a full match, a partial match, or no match to malicious content based on the inspection; and performing any of blocking the content, allowing the content, and storing a context entry of the content based on the label assigned to the content.

20 Claims, 21 Drawing Sheets

(56) References Cited

U.S. PATENT DOCUMENTS

| | | | | |
|---|---|---|---|---|
| 2018/0375884 | A1* | 12/2018 | Kopp | G06F 21/552 |
| 2019/0182274 | A1* | 6/2019 | Doron | G06N 3/044 |
| 2019/0207967 | A1* | 7/2019 | Vashisht | H04L 63/1408 |
| 2019/0228151 | A1* | 7/2019 | Schmugar | H04L 63/145 |
| 2020/0358827 | A1 | 11/2020 | Foxhoven et al. | |
| 2021/0136041 | A1 | 5/2021 | Foxhoven et al. | |
| 2021/0250333 | A1* | 8/2021 | Negrea | H04L 63/0876 |
| 2021/0314301 | A1 | 10/2021 | Chanak et al. | |
| 2021/0336932 | A1 | 10/2021 | Chanak et al. | |
| 2021/0336933 | A1 | 10/2021 | Shah et al. | |
| 2021/0336934 | A1 | 10/2021 | Deshmukh et al. | |
| 2021/0336959 | A1 | 10/2021 | Shah et al. | |
| 2021/0377222 | A1 | 12/2021 | Sharma et al. | |
| 2021/0377223 | A1 | 12/2021 | Chanak et al. | |
| 2022/0029965 | A1 | 1/2022 | Chanak et al. | |
| 2022/0247758 | A1* | 8/2022 | Du | H04L 63/1416 |
| 2022/0353244 | A1 | 11/2022 | Kahn et al. | |
| 2023/0019448 | A1 | 1/2023 | Deshmukh et al. | |
| 2023/0224314 | A1* | 7/2023 | Kolluru | H04L 63/1425 726/22 |
| 2023/0308460 | A1* | 9/2023 | Thomas | H04L 63/102 |
| 2023/0412564 | A1* | 12/2023 | Cai | H04L 63/1416 |

* cited by examiner

FIG. 1B
Google
CNN
Office 365
now
box
aws
ZERO-TRUST
100
IoT
OT
Factory
Data Center
Workforce
Customers

2100

APPLICATION SERVER PROTECTION BY MAINTAINING CROSS-SESSION INSPECTION CONTEXT

FIELD OF THE DISCLOSURE

The present disclosure generally relates to computer networking systems and methods. More particularly, the present disclosure relates to systems and methods for application server protection by maintaining cross-session inspection context.

BACKGROUND OF THE DISCLOSURE

Remote browser isolation is a technique where a user's browser or applications are physically isolated away from the user device, the local network, etc. thereby removing the risks of malicious code, malware, cyberattacks, etc. This has shown to be an effective technique for enterprises to reduce attacks and protect servers from malicious content. Although, security loopholes exist which allow content to be copied to a server over such remote access. These loopholes include clipboard and cross-packet signature match techniques. The systems methods described herein address such security problems by maintaining user session context and using deep packet inspection methods to alert on and block malicious content.

BRIEF SUMMARY OF THE DISCLOSURE

The present disclosure relates to systems and methods for application server protection by maintaining cross-session inspection context. In an embodiment, steps include monitoring user traffic in a cloud-based system; performing an inspection of the user traffic to determine if the user traffic includes malicious content; assigning a label to content of the user traffic, the label identifying the content as having any of a full match, a partial match, or no match to malicious content based on the inspection; and performing any of blocking the content, allowing the content, and storing a context entry of the content based on the label assigned to the content.

The inspection can include identifying malicious signatures in the content. The content can include one or more files being transferred to a server over one or more remote access protocols. The context entry can include any of a tenant identity, a user identity, a remote session identifier, and the label associated with the content. The steps can further include storing a context entry of the content in response to a partial match label being assigned to the content, and maintaining the context entry for a period of time. The context entry can be associated with a specific user. The context entry can be maintained after a logout of the user. The context entry can be a first context entry associated with first content, wherein the steps further include monitoring and inspecting user traffic; labeling second content as a partial match to malicious content; and identifying a combination of the first context entry and the second content as malicious. The steps can further include blocking the first content and the second content; and sending an alert notifying the detection of malware. The second content can be monitored during a different session than the first content. In various embodiments, any number of context entries can be combined to identify malicious content.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

DETAILED DESCRIPTION OF THE DISCLOSURE

The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
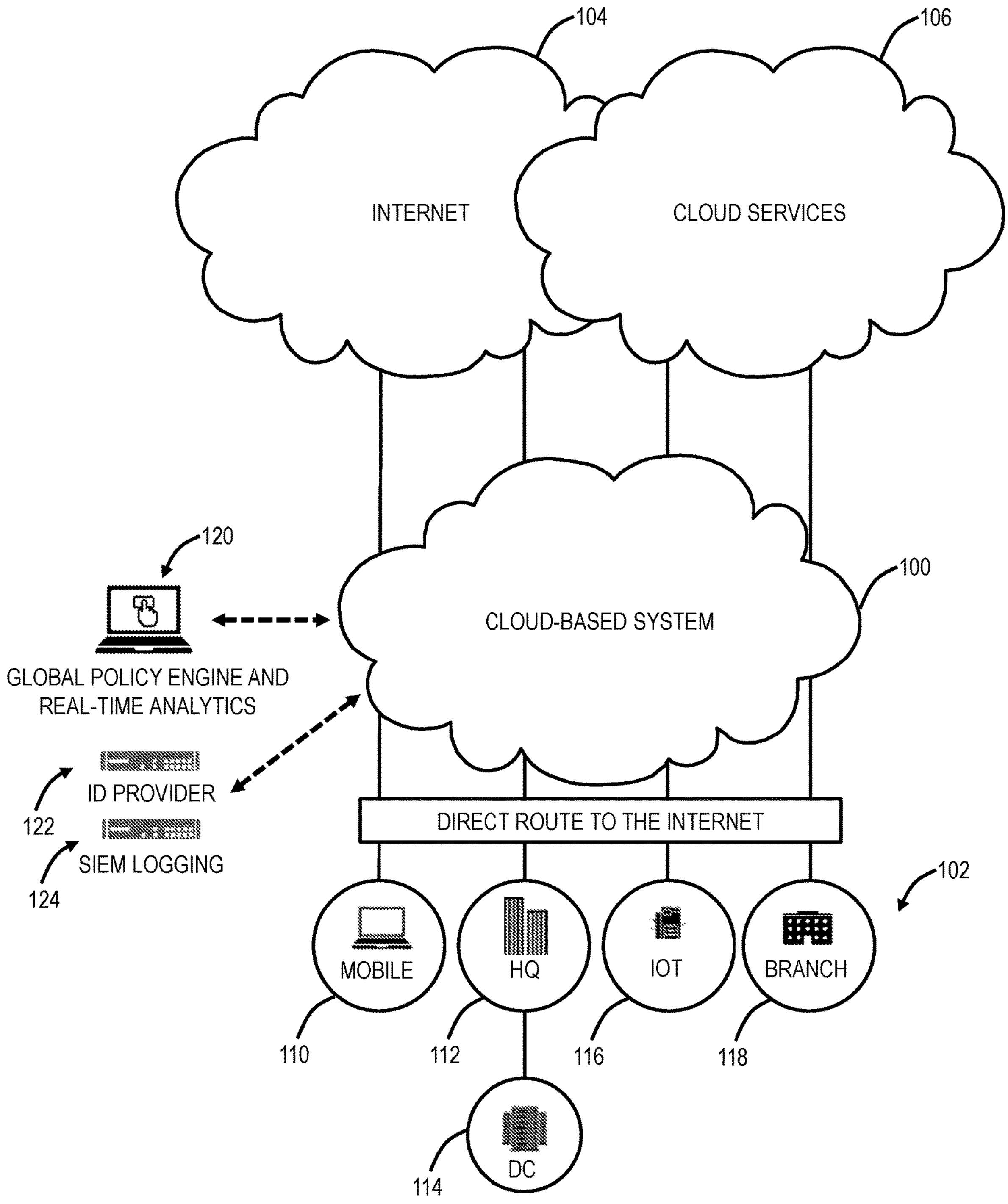
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
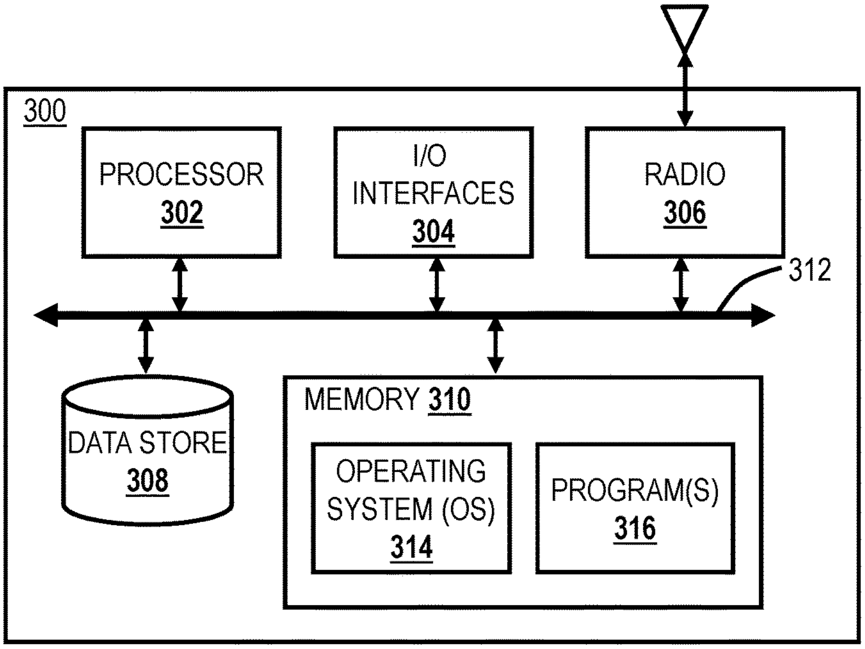

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
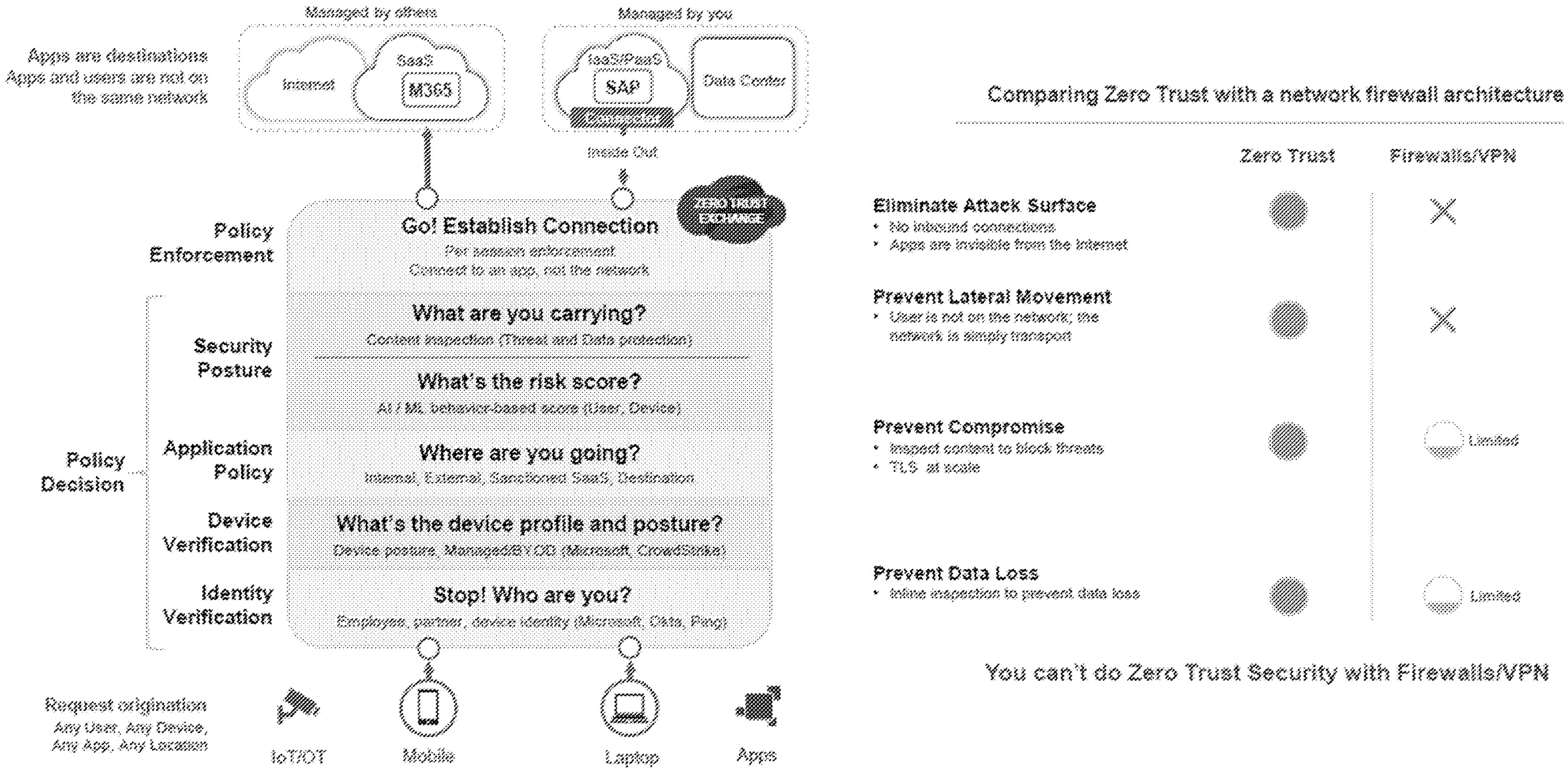
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
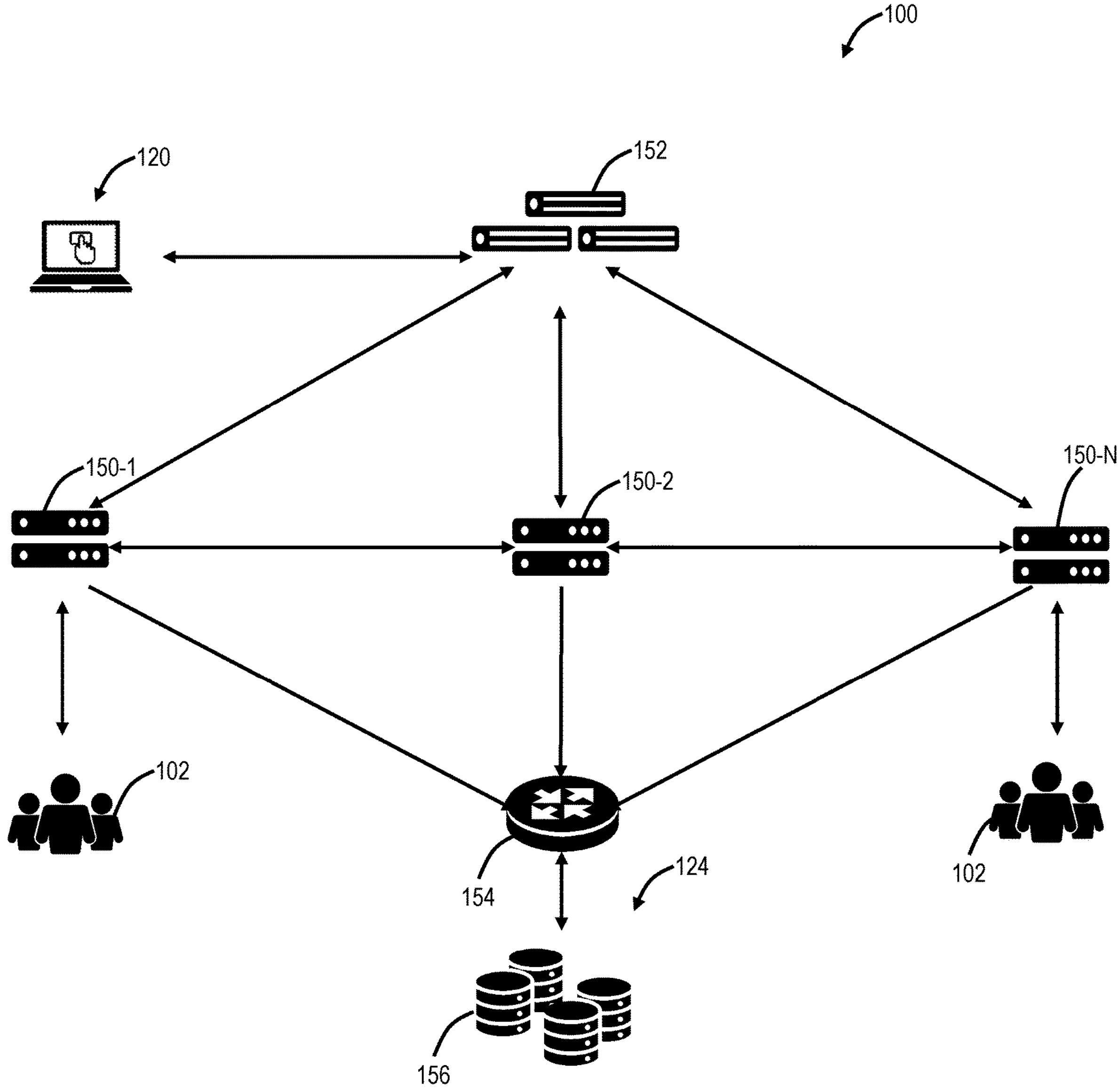
FIG. 2 is a network diagram of an example implementation of the cloud-based system.
Figure 4:
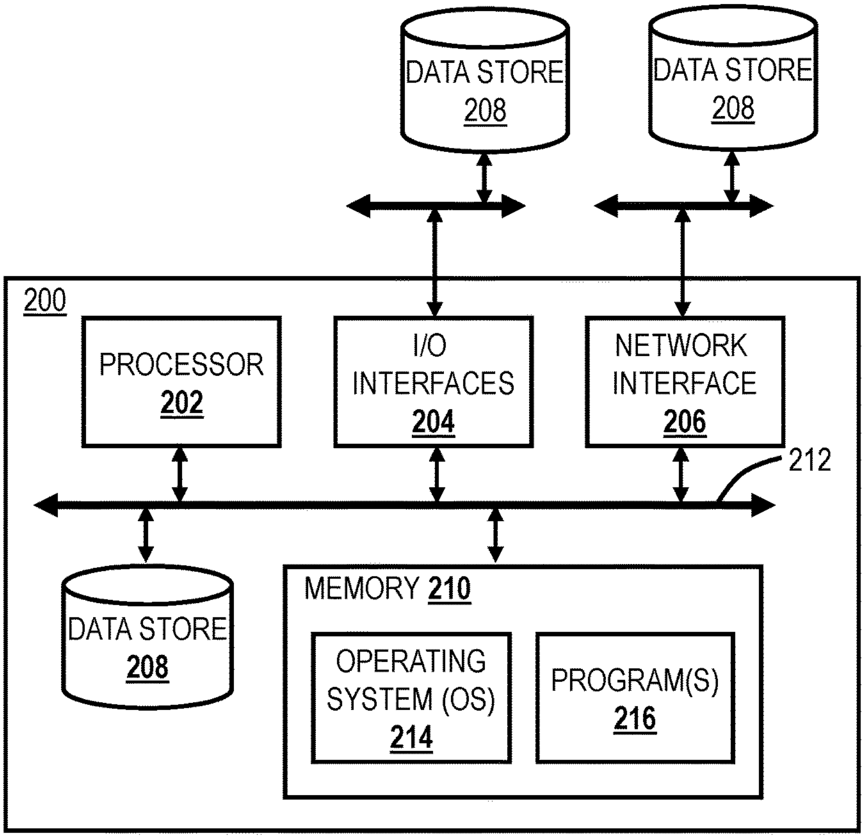
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
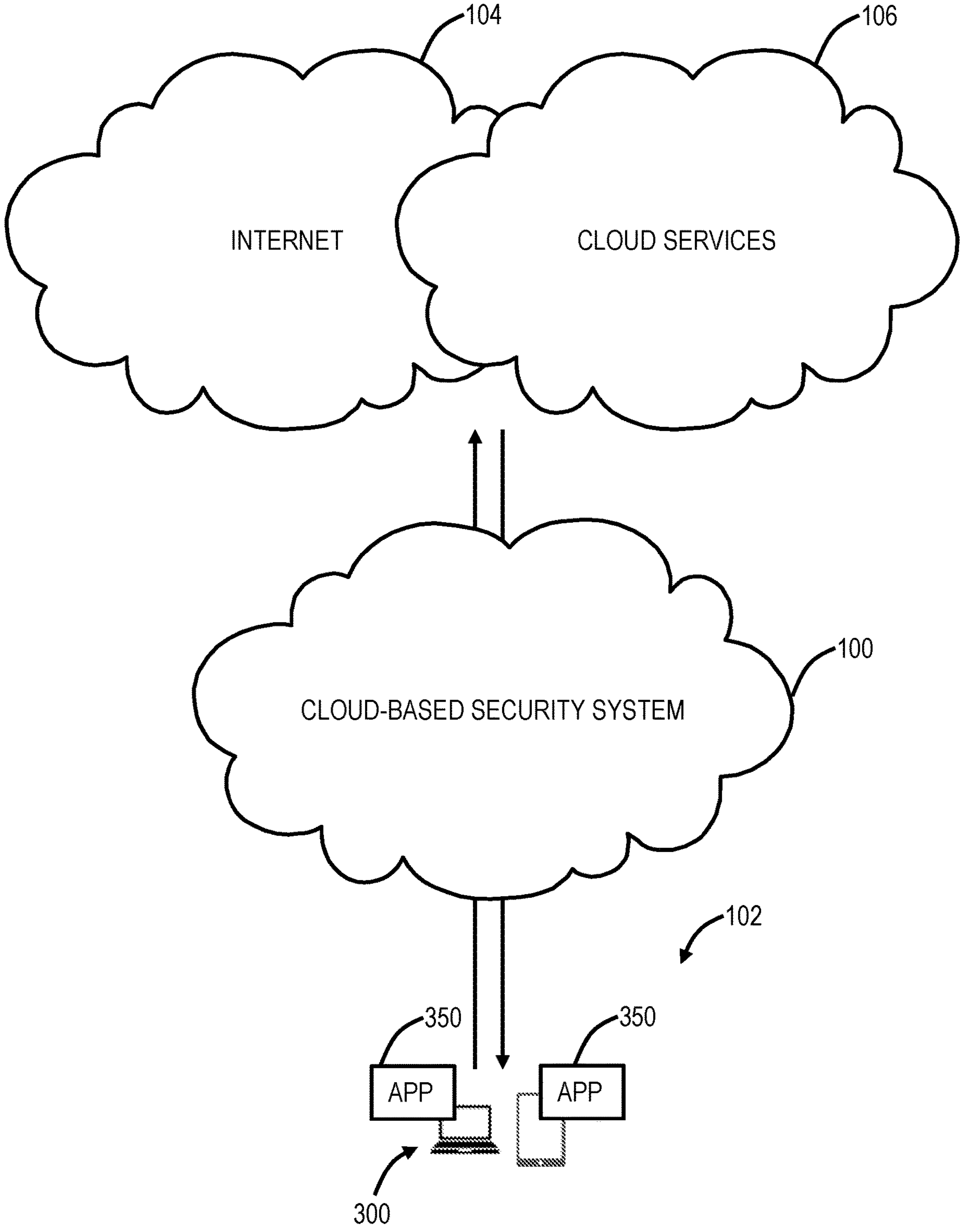
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
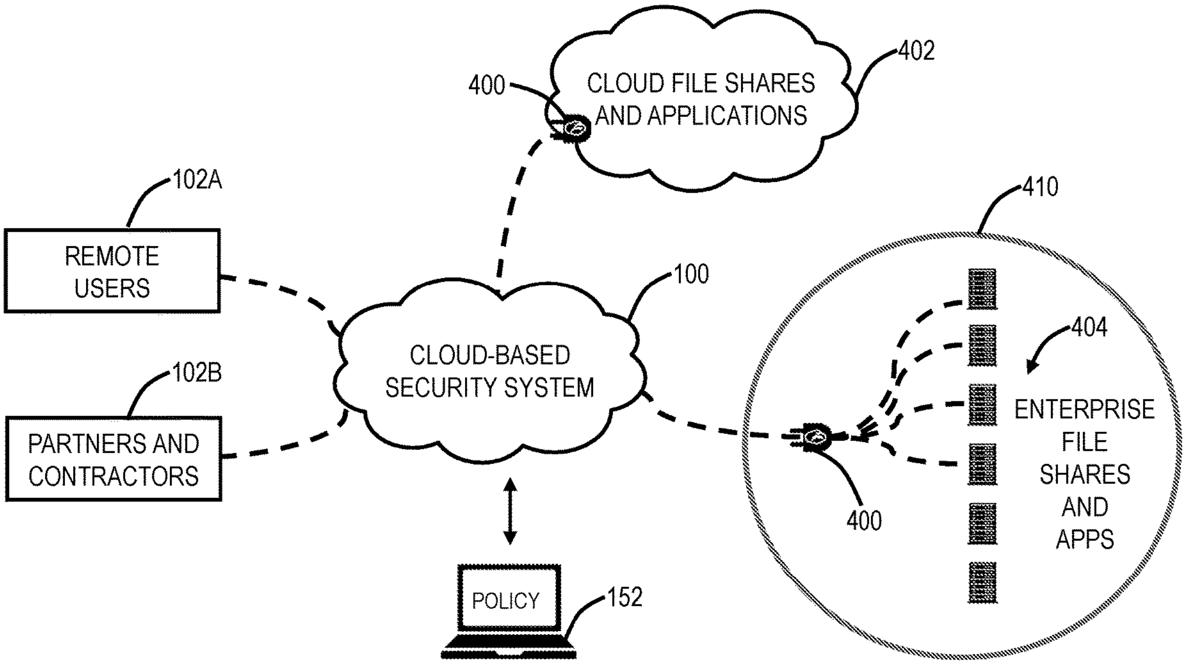
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

VPN Architecture

Figure 7:
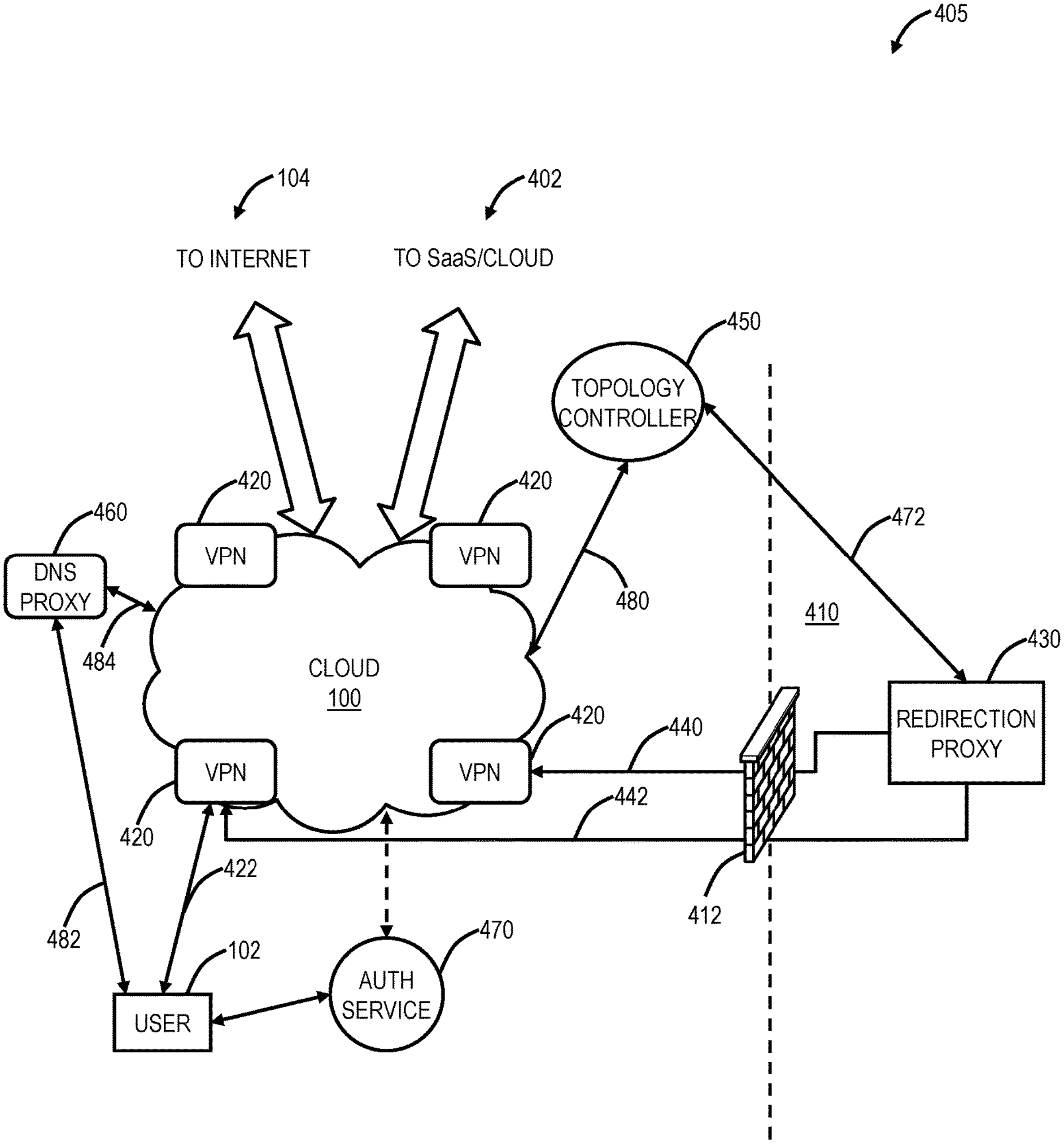
FIG. 7 is a network diagram of a VPN architecture for an intelligent, cloud-based global VPN.

FIG. 7 is a network diagram of a VPN architecture 405 for an intelligent, cloud-based global VPN. For illustration purposes, the VPN architecture 405 includes the cloud-based system 100, the Internet 104, the applications 402 in SaaS/public cloud systems, and the enterprise network 410. The VPN architecture 405 also includes a user 102, which can include any computing device/platform connecting to the cloud-based system 100, the Internet 104, the applications 402, and the enterprise network 410. The VPN architecture 405 includes a single user 102 for illustration purposes, but those of ordinary skill in the art will recognize that the VPN architecture 405 contemplates a plurality of users 102. The user 102 can be a nomadic user, a regional/branch office, etc. That is, the user 102 can be any user of the enterprise network 410 that is physically located outside a firewall 412 associated with the enterprise network 410. The SaaS/public cloud systems can include any systems containing computing and data assets in the cloud such as, for example, Microsoft OneDrive, Google Drive, Dropbox, Apple iCloud, Customer Relationship Management (CRM) systems, SCM, Sales management systems, etc. The enterprise network 410 includes local computing and data assets behind the firewall 412 for additional security on highly confidential assets or legacy assets not yet migrated to the cloud.

The user 102 needs to access the Internet 104, the SaaS/public cloud systems for the applications 402, and the enterprise network 410. Again, conventionally, the solution for secure communication, the user 102 has a VPN connection through the firewall 412 where all data is sent to the enterprise network 410, including data destined for the Internet 104 or the SaaS/public cloud systems for the applications 402. Furthermore, this VPN connection dials into the enterprise network 410. The systems and methods described herein provide the VPN architecture 405, which provides a secure connection to the enterprise network 410 without bringing all traffic, e.g., traffic for the Internet 104 or the SaaS/public cloud systems, into the enterprise network 410 as well as removing the requirement for the user 102 to dial into the enterprise network 410.

Instead of the user 102 creating a secure connection through the firewall 412, the user 102 connects securely to a VPN device 420 located in the cloud-based system 100 through a secure connection 422. Note, the cloud-based system 100 can include a plurality of VPN devices 420. The VPN architecture 405 dynamically routes traffic between the user 102 and the Internet 104, the SaaS/public cloud systems for the applications 402, and securely with the enterprise network 410. For secure access to the enterprise network 410, the VPN architecture 405 includes dynamically creating connections through secure tunnels between three entities: the VPN device 420, the cloud, and an on-premises redirection proxy 430. The connection between the cloud-based system 100 and the on-premises redirection proxy 430 is dynamic, on-demand and orchestrated by the cloud-based system 100. A key feature of the systems and methods is its security at the edge of the cloud-based system 100—there is no need to punch any holes in the existing on-premises firewall 412. The on-premises redirection proxy 430 inside the enterprise network 410 "dials out" and connects to the cloud-based system 100 as if too were an end-point via secure connections 440, 442. This on-demand dial-out capability and tunneling authenticated traffic back to the enterprise network 410 is a key differentiator.

The VPN architecture 405 includes the VPN devices 420, the on-premises redirection proxy 430, a topology controller 450, and an intelligent DNS proxy 460. The VPN devices 420 can be Traffic (VPN) distribution servers and can be part of the cloud-based system 100. In an embodiment, the cloud-based system 100 can be a security cloud such as available from Zscaler, Inc. (www.zscaler.com) performing functions on behalf of every client that connects to it: a) allowing/denying access to specific Internet sites/apps—based on security policy and absence/presence of malware in those sites, and b) set policies on specific SaaS apps and allowing/denying access to specific employees or groups.

The on-premises redirection proxy 430 is located inside a perimeter of the enterprise network 410 (inside the private cloud or inside the corporate data center—depending on the deployment topology). It is connected to a local network and acts as a "bridge" between the users 102 outside the perimeter and apps that are inside the perimeter through the secure connections 440, 442. But, this "bridge" is always closed—it is only open to the users 102 that pass two criteria: a) they must be authenticated by an enterprise authentication service 470, and b) the security policy in effect allows them access to "cross the bridge."

When the on-premises redirection proxy 430 starts, it establishes a persistent, long-lived connection 472 to the topology controller 450. The topology controller 450 connects to the on-premises redirection proxy 430 through a secure connection 472 and to the cloud-based system 100 through a secure connection 480. The on-premises redirection proxy 430 waits for instruction from the topology controller 450 to establish tunnels to specific VPN termination nodes, i.e., the VPN devices 420, in the cloud-based system 100. The on-premises redirection proxy 430 is most expediently realized as custom software running inside a virtual machine (VM). The topology controller 450, as part of the non-volatile data for each enterprise, stores the network topology of a private network of the enterprise network 410, including, but not limited to, the internal domain name(s), subnet(s) and other routing information.

The DNS proxy 460 handles all domain names to Internet Protocol (IP) Address resolution on behalf of endpoints (clients). These endpoints are user computing devices—such as mobile devices, laptops, tablets, etc. The DNS proxy 460 consults the topology controller 450 to discern packets that must be sent to the Internet 104, the SaaS/public cloud systems, vs. the enterprise network 410 private network. This decision is made by consulting the topology controller 450 for information about a company's private network and domains. The DNS proxy 460 is connected to the user 102 through a connection 482 and to the cloud-based system 100 through a connection 484.

The VPN device 420 is located in the cloud-based system 100 and can have multiple points-of-presence around the world. If the cloud-based system 100 is a distributed security cloud, the VPN device 420 can be located with enforcement nodes 150. In general, the VPN device 420 can be implemented as software instances on the enforcement nodes 150, as a separate virtual machine on the same physical hardware as the enforcement nodes 150, or a separate hardware device such as the server 200, but part of the cloud-based system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are set up for each user on demand. When the VPN device 420 determines that a packet from the user 102 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the enforcement nodes 150—to continue processing as before or send directly to the Internet 104 or SaaS clouds.

VPN Process

Figure 8:
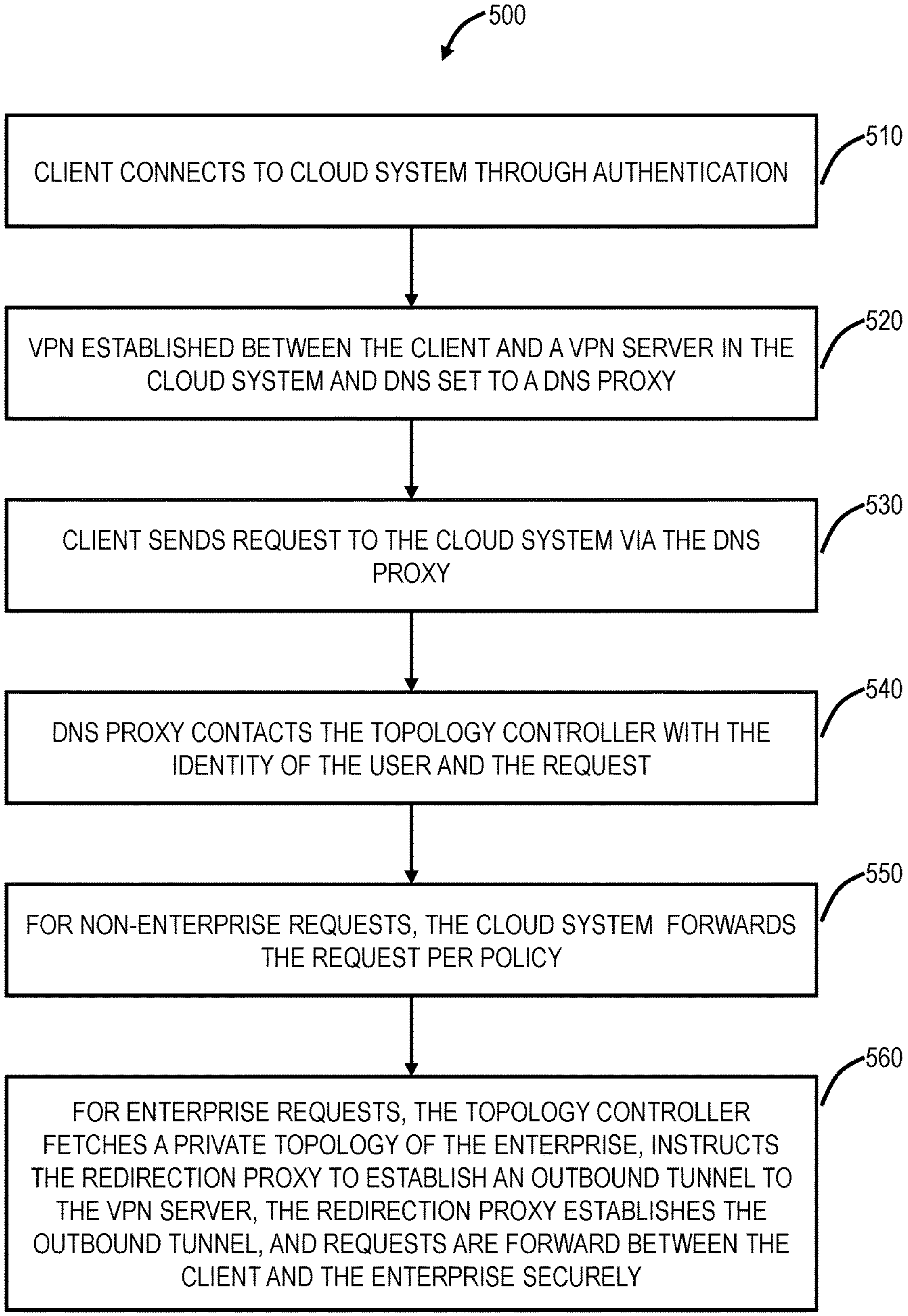
FIG. 8 is a flowchart of a VPN process for an intelligent, cloud-based global VPN.

FIG. 8 is a flowchart of a VPN process 500 for an intelligent, cloud-based global VPN. The VPN process 500 can be implemented through the VPN architecture 405. The VPN process 500 includes the user 102 connecting to the cloud-based system 100 through authentication (step 510). Once the authentication is complete, a VPN is established between the user 102 and a VPN server in the cloud-based system 100 and DNS for the user 102 is set to a DNS proxy 460 (step 520). Now, the user 102 has a secure VPN connection to the cloud-based system 100. Subsequently, the user 102 sends a request to the cloud-based system 100 via the DNS proxy 460 (step 530). Here, the request can be anything-request for the enterprise network 410, the Internet 104, the applications 402 in the SaaS/public cloud systems, the applications 404 in the enterprise network 410, etc. The DNS proxy 460 contacts the topology controller 450 with the identity of the user and the request (step 540). That is, whenever the user 102 wishes to reach a destination (Internet, Intranet, SaaS, etc.), it will consult the DNS proxy 460 to obtain the address of the destination.

For non-enterprise requests, the cloud-based system 100 forwards the request per policy (step 550). Here, the cloud-based system 100 can forward the request based on the policy associated with the enterprise network 410 and the user 102. With the identity of the user and the enterprise they belong to, the VPN server will contact the topology controller 450 and pre-fetch the enterprise private topology. For enterprise requests, the topology controller 450 fetches a private topology of the enterprise network 410, instructs the redirection proxy 430 to establish an outbound tunnel to the VPN server, the redirection proxy 430 establishes the outbound tunnel, and requests are forward between the user 102 and the enterprise network 410 securely (step 560). Here, the DNS proxy 460 works with the topology controller 450 to determine the local access in the enterprise network 410, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN Applications

Advantageously, the systems and methods avoid the conventional requirement of VPN tunneling all data into the enterprise network 410 and hair-pinning non-enterprise data back out. The systems and methods also allow the enterprise network 410 to have remote offices, etc. without requiring large hardware infrastructures—the cloud-based system 100 bridges the users 102, remote offices, etc. to the enterprise network 410 in a seamless manner while removing the requirement to bring non-enterprise data through the enterprise network 410. This recognizes the shift to mobility in enterprise applications. Also, the VPN tunnel on the user 102 can leverage and use existing VPN clients available on the user devices 300. The cloud-based system 100, through the VPN architecture 405, determines how to route traffic for the user 102 efficiently—only enterprise traffic is routed securely to the enterprise network 410. Additionally, the VPN architecture 405 removes the conventional requirement of tunneling into the enterprise network 410, which can be an opportunity for security vulnerabilities. Instead, the redirection proxy 430 dials out of the enterprise network 410.

The systems and methods provide, to the user (enterprise user), a single, seamless way to connect to Public and Private clouds—with no special steps needed to access one vs. the other. To the IT Admin, the systems and methods provide a single point of control and access for all users—security policies and rules are enforced at a single global cloud chokepoint—without impacting user convenience/performance or weakening security.

Virtual Private Access Via the Cloud

Figure 9:
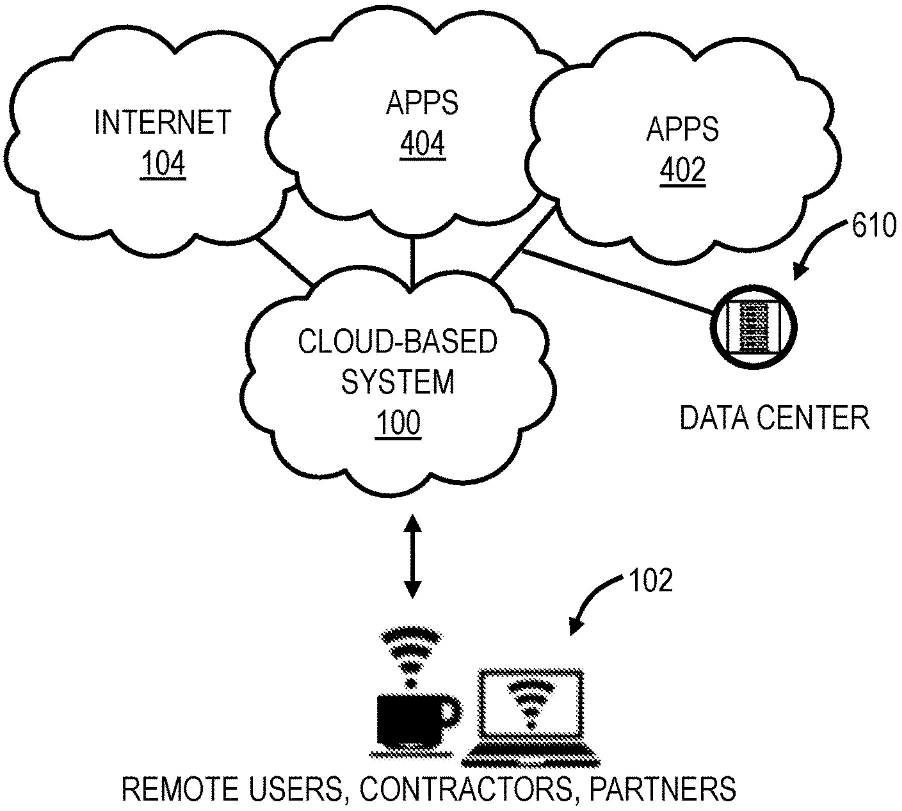
FIG. 9 is a network diagram illustrating the cloud-based system with private applications and data centers connected thereto to provide virtual private access through the cloud-based system.

FIG. 9 is a network diagram illustrating the cloud-based system 100 with private applications 402, 404 and data centers 610 connected thereto to provide virtual private access through the cloud-based system 100. In an aspect, the virtual private access described herein leverages the cloud-based system 100 to enable various users 102 including remote users, contractors, partners, business customers, etc., i.e., anyone who needs access to the private applications 402, 404 and the data centers 610 access, without granting unfettered access to the internal network, without requiring hardware or appliances, and in a seamless manner from the users' 102 perspective. The private applications 402, 404 include applications dealing with financial data, personal data, medical data, intellectual property, records, etc., that is the private applications 404 can be available on the enterprise network 410, but not available remotely except conventionally via VPN access. Examples of the private applications 402, 404 can include Customer Relationship Management (CRM), sales automation, financial applications, time management, document management, etc. Also, the applications 402, 404 can be B2B applications or services as described herein.

The virtual private access is a new technique for the users 102 to access the file shares and applications 402, 404, without the cost, hassle or security risk of VPNs, which extend network access to deliver app access. The virtual private access decouples private internal applications from the physical network to enable authorized user access to the file shares and applications 402, 404, without the security risk or complexity of VPNs. That is, virtual private access takes the “Network” out of VPNs.

In the virtual private access, the users 102, the file shares and applications 402, 404, are communicatively coupled to the cloud-based system 100, such as via the Internet 104 or the like. On the client-side, at the users 102, the applications 402, 404 provision both secure remote access and optionally accessibility to the cloud-based system 100. The application 402, 404 establishes a connection to the closest enforcement node 150 in the cloud-based system 100 at startup and may not accept incoming requests.

At the file shares and applications 402, 404, the lightweight connectors 400 sit in front of the applications 402, 404. The lightweight connectors 400 become the path to the file shares and applications 402, 404 behind it, and connect only to the cloud-based system 100. The lightweight connectors 400 can be lightweight, ephemeral binary, such as deployed as a virtual machine, to establish a connection between the file shares and applications 402, 404 and the cloud-based system 100, such as via the closest enforcement node 150. The lightweight connectors 400 do not accept inbound connections of any kind, dramatically reducing the overall threat surface. The lightweight connectors 400 can be enabled on a standard VMware platform; additional lightweight connectors 400 can be created in less than 5 seconds to handle additional application instances. By not accepting inbound connections, the lightweight connectors 400 make the file shares and applications 402, 404 “dark,” removing a significant threat vector.

The policy can be established and pushed by policy engines in the central authority 152, such as via a distributed cluster of multi-tenant policy engines that provide a single interface for all policy creation. Also, no data of any kind transits the policy engines. The enforcement nodes 150 in the security cloud stitch connections together, between the users 102 and the file shares and applications 402, 404, without processing traffic of any kind. When the user 102 requests an application in the file shares and applications 402, 404, the policy engine delivers connection information to the application 350 and app-side enforcement nodes 150, which includes the location of a single enforcement nodes 150 to provision the client/app connection. The connection is established through the enforcement nodes 150, and is encrypted with a combination of the customer’s client and server-side certificates. While the enforcement nodes 150 provision the connection, they do not participate in the key exchange, nor do they have visibility into the traffic flows.

Advantageously, the virtual private access provides increased security in that the file shares and applications 402, 404 are visible only to the users 102 that are authorized to access them; unauthorized users are not able to even see them. Because application access is provisioned through the cloud-based system 100, rather than via a network connection, the virtual private access makes it impossible to route back to applications. The virtual private access is enabled using the application 350, without the need to launch or exit VPN clients. The application access just works in the background enabling application-specific access to individual contractors, business partners or other companies, i.e., the users 102.

The virtual private access provides capital expense (CAPEX) and operating expense (OPEX) reductions as there is no hardware to deploy, configure, or maintain. Legacy VPNs can be phased out. Internal IT can be devoted to enabling business strategy, rather than maintaining network “plumbing.” Enterprises can move apps to the cloud on their schedule, without the need to re-architect, set up site-to-site VPNs or deliver a substandard user experience.

The virtual private access provides easy deployment, i.e., put lightweight connectors 400 in front of the file shares and applications 402, 404, wherever they are. The virtual private access will automatically route to the location that delivers the best performance. Wildcard app deployment will discover applications upon request, regardless of their location, then build granular user access policies around them. There is no need for complex firewall rules, Network Address Translation issues or policy juggling to deliver application access. Further, the virtual private access provides seamless integration with existing Single Sign-On (SSO) infrastructure.

Figure 10:
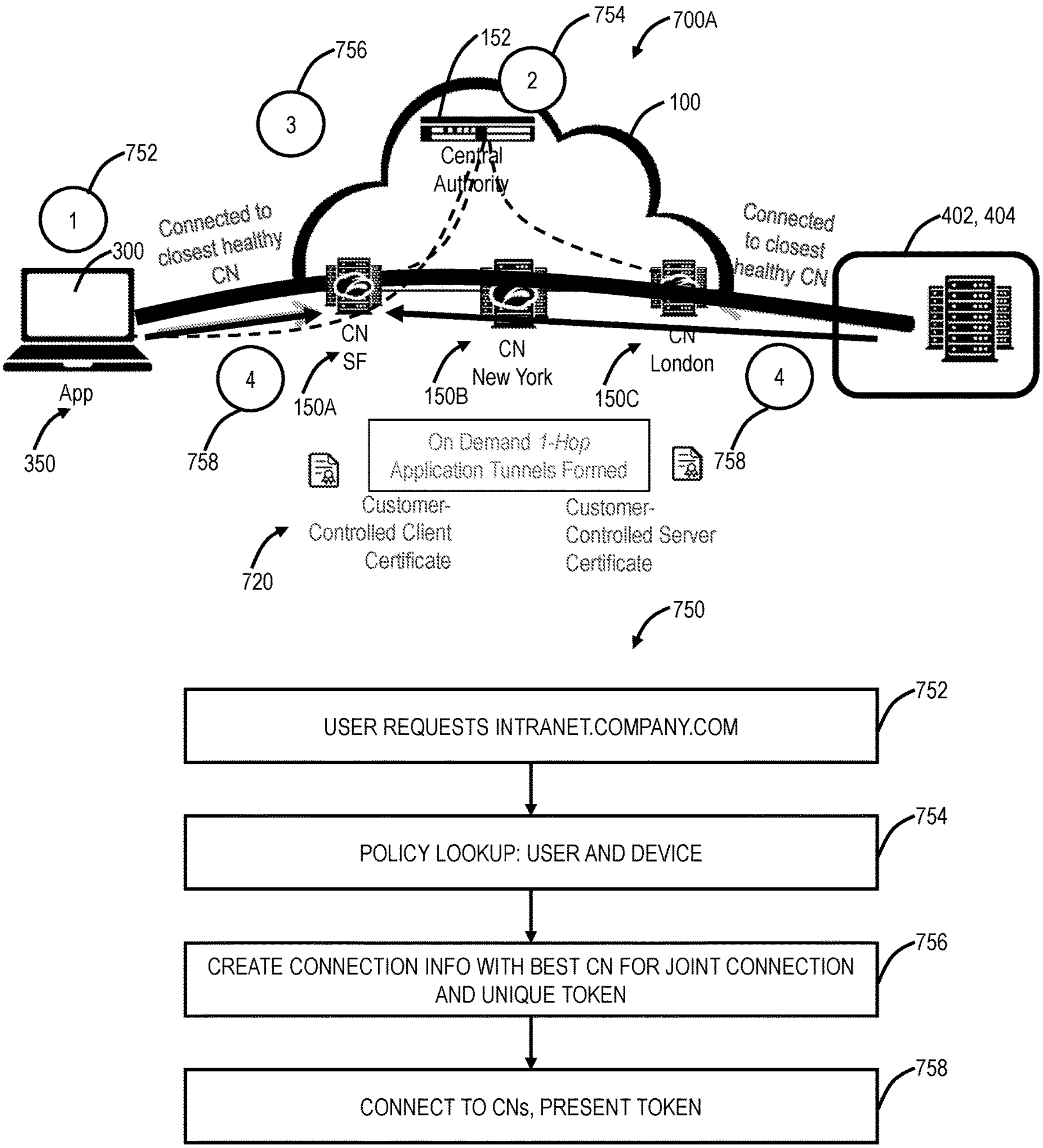
FIG. 10 is a network diagram of a virtual private access network and a flowchart of a virtual private access process implemented thereon.

FIG. 10 is a network diagram of a virtual private access network 700A and a flowchart of a virtual private access process 750 implemented thereon. The cloud-based system 100 includes three enforcement nodes 150A, 150B, 150C, assume for illustration purposes in San Francisco, New York, and London, respectively. The user 102 has the application 350 executing on the user device 300, which is communicatively coupled to the enforcement node 150A. The enterprise file share and application 402, 404 is communicatively coupled to the enforcement node 150C. Note, there can be direct connectivity between the enforcement nodes 150A, 150C, the enforcement nodes 150A, 150C can connect through the enforcement node 150B, or both the user 102 and the enterprise file share and application 402, 404 can be connected to the same node 150. That is, the architecture of the cloud-based system 100 can include various implementations.

The virtual private access process 750 is described with reference to both the user 102, the cloud-based system 100, and the enterprise file share and application 402, 404. First, the user 102 is executing the application 350 on the user device 300, in the background. The user 102 launches the application 350 and can be redirected to an enterprise ID provider or the like to sign on, i.e., a single sign on, without setting up new accounts. Once authenticated, Public Key Infrastructure (PKI) certificate 720 enrollment occurs, between the user 102 and the enforcement node 150A. With the application 350 executing on the user device, the user 102 makes a request to the enterprise file share and application 402, 404, e.g., intranet.company.com, crm.company.com, etc. (step 752). Note, the request is not limited to web applications and can include anything such as a remote desktop or anything handling any static Transmission Control Protocol (TCP) or User Datagram Protocol (UDP) applications.

This request is intercepted by the enforcement node 150A and redirected to the central authority 152, which performs a policy lookup for the user 102 and the user device 300 (step 754), transparent to the user 102. The central authority 152 determines if the user 102 and the user device 300 are authorized for the enterprise file share and application 402, 404. Once authorization is determined, the central authority 152 provides information to the enforcement nodes 150A, 150B, 150C, the application 350, and the lightweight connectors 400 at the enterprise file share and application 402, 404, and the information can include the certificates 720 and other details necessary to stitch secure connections between the various devices. Specifically, the central authority 152 can create connection information with the best enforcement nodes 150 for joint connections, from the user 102 to the enterprise file share and application 402, 404, and the unique tokens (step 756). With the connection information, the enforcement node 150A connects to the user 102, presenting a token, and the enforcement node 150C connects to the lightweight connector 400, presenting a token (step 758). Now, a connection is stitched between the user 102 to the enterprise file share and application 402, 404, through the application 350, the enforcement nodes 150A, 150B, 150C, and the lightweight connector 400.

Browser Isolation

Browser (web) isolation is a technique where a user's browser or apps are physically isolated away from the user device, the local network, etc. thereby removing the risks of malicious code, malware, cyberattacks, etc. This has been shown to be an effective technique for enterprises to reduce attacks. Techniques for browser isolation are described in commonly-assigned U.S. patent application Ser. No. 16/702,889, filed Dec. 4, 2019, and entitled "Cloud-based web content processing system providing client threat isolation and data integrity," the contents of which are incorporated by reference herein. Traditionally browser isolation was focused on removing the risks of malicious code, malware, cyberattacks, etc. U.S. patent application Ser. No. 16/702,889 describes an additional use case of preventing data exfiltration. That is, because no data is delivered to the local system (e.g., to be processed by web content through the local web browser), none of the confidential or otherwise sensitive data can be retained on the local system.

The secure access can interoperate with browser isolation through the cloud-based system 100, to prevent data exfiltration, which is extremely critical as this is customer-facing data which adds to the sensitivity and liability, and also accessible to external users (customers). This functionality forces customers to interact with the B2B applications via an isolated, contained environment.

Secure, Isolated Cloud Environment

Figure 11:
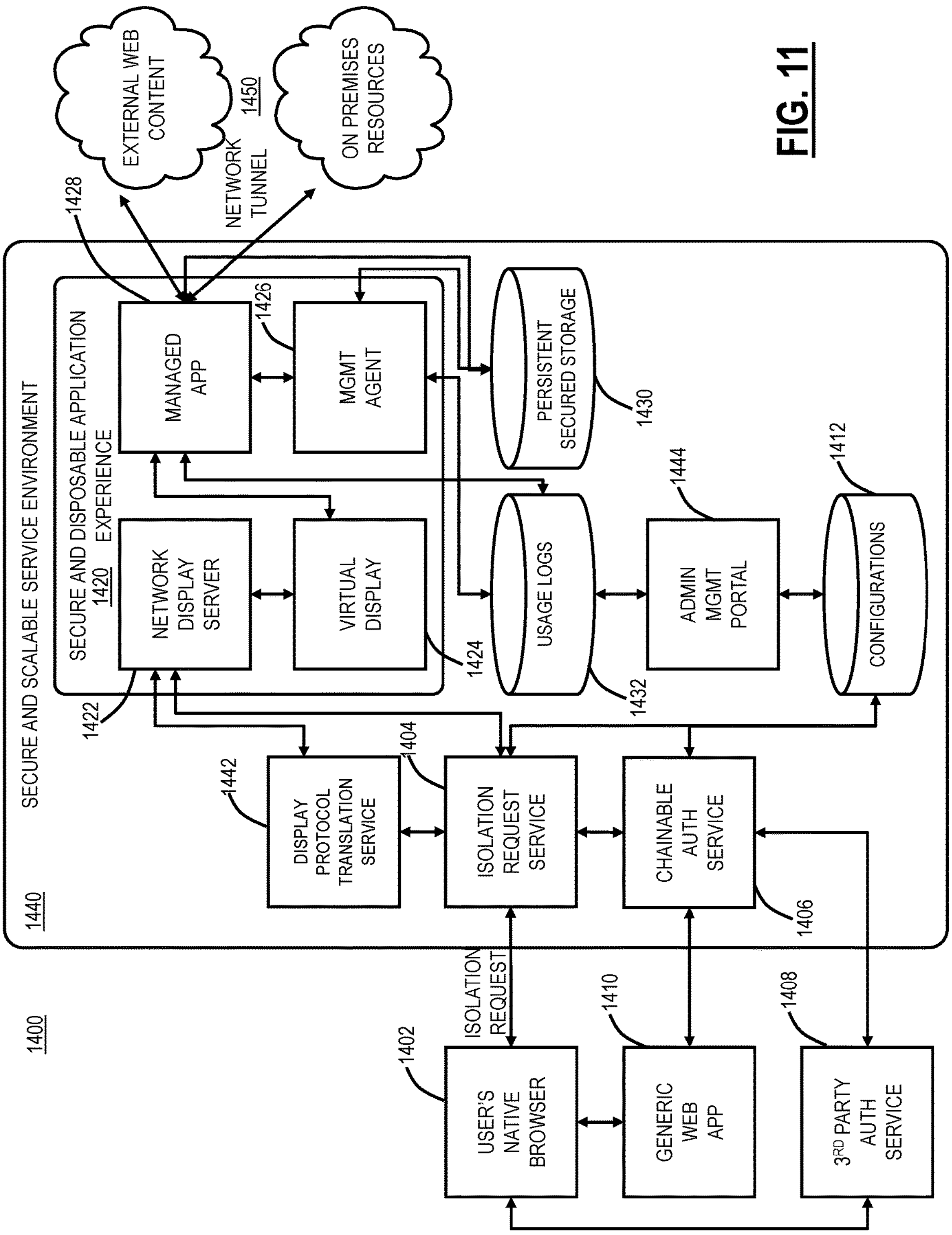
FIG. 11 is a block diagram of a secure, isolated cloud environment.

FIG. 11 is a block diagram of a secure, isolated cloud environment 1400. The user device 300 includes a native browser 1402 that is configured to connect, such as via WebSocket channels, to an isolation request service 1404 and to display image data received from the isolation request service 1404. The native browser 1402 can be any standard HTML5 compliant web browser.

A chainable authentication service 1406 can be instantiated into a service that can be chained and proxy the authentication to another third party authentication service 1408 or can end the chain to a local user store. When this service 1406 acts as a chain, it typically sits between a Web App 1410 and the third party authentication service 1408 and acts as a middleman by checking originating request and forwarding to an Identity Provider based on certain policies available in configuration storage 1412. The chainable authentication service 1406 can utilize one of the well-known authentication or federation protocols (SAML, OAUTH, OPENID, etc.) and can interact with third-party authentication service 1408 that utilize similar protocols. The policies of this service sit in the configuration storage 1412 and are being processed at runtime based on information embedded in the request URL.

The isolation request service 1404 is an Internet-facing web service capable of processing external isolation requests by doing a series of actions: one such action can be authenticating a user by redirecting to the chainable authentication service 1406, another action can be fetching Configuration policies for the user at runtime by connecting to an Application Programming Interface (API) to retrieve the policies. Policies obtained from the configuration storage 1412 are used to instantiate a secure and disposable application environment 1420.

A network display server 1422 is a component that is capable of forwarding data coming from a virtual display 1424 inside an Operating System and send it to the network in a given protocol format. It is typically a piece of software that provides connectivity to the display driver of an Operating System and lives in the user space of the Operating System. An example of such server can be the Remote Desktop Protocol (RDP) server that lives as a userspace application on top of an existing X Display in a Linux Operating System and streams the content of the display over the network.

A management agent 1426 is a component that helps with managing the secure and disposable application environment 1420 lifecycle and provisioning mechanisms. The management agent 1426 helps provisioning and auto-configuration of a managed application 1428.

The managed application 1428 can be any application (web or non-web) that is able to run in a managed environment on top of an Operating System. The managed application 1428 is purposely built or modified to be able to be managed through the management agent 1426. The lifecycle of the application and the provisioning of configuration and policies depends on the communication with the management agent 1426. The managed application 1428 may or may not have access to an external network. Through a network tunnel may have access to some other internal resources. An example of such an application can be a web browser or a Secure Shell (SSH) client.

The secure and disposable application environment 1420 is a transient, non-persistent, managed, and containerized application experience that contains the necessary functions to expose the actual User Interface of the managed application 1428 to the outside world using the network display server 1422. The secure and disposable application environment 1420 is managed through the management agent 1426.

A persistent secured storage 1430 is secured storage system that can be used to save user settings or sessions from one session of managed application 1428 to another in order to keep a managed application 1428 state across user sessions.

The third-party authentication service 1408 is an identity provider or authentication service capable of speaking a standardized federation or authentication protocol (such as OpenID, OAuth, SAML) that is able to securely authenticate users that it has governance over.

Usage logs 1432 are logs and event data generated by the user while using the managed application 1428 on within the secure and disposable application environment 1420. The logs and event data pertain to the capabilities of the managed application 1428 as well as to other agnostic event information such as geolocation, time and named user doing the fore mentioned event.

The configuration storage 1412 is a data store exposed to the outside world through an API. The datastore persists policies that define how the chainable authentication service 1406 will work and how the managed application experience will behave when a user uses it. In the configuration storage 1412, security and behavioral policies are included that determine what the user will see, experience, and be restricted to do inside the secure and disposable application environment 1420. An example of such a policy can be the capability of copying content from the managed application 1428 to the user's native browser 1402.

A secure and scalable service environment 1440 can be a collection of microservices that can be deployed in cloud-based environments or completely on-premise. Typically, one such environment can be being served for each company/customer.

A display protocol translation service 1442 is a service or server that converts from a type of display protocol provided by the network display server 1422 to a browser-friendly protocol. An example of such service can be a translator from Remote Desktop Protocol to an HTML5 compatible protocol.

An admin management portal 1444 is a web-based portal for administrators to manage configurations in the configurations storage 1412 and view the managed application 1428 usage logs and reporting.

In an embodiment, the secure and disposable application environment 1420 can enable the download of files onto the user device and vice versa, based on policy.

Figure 12A:
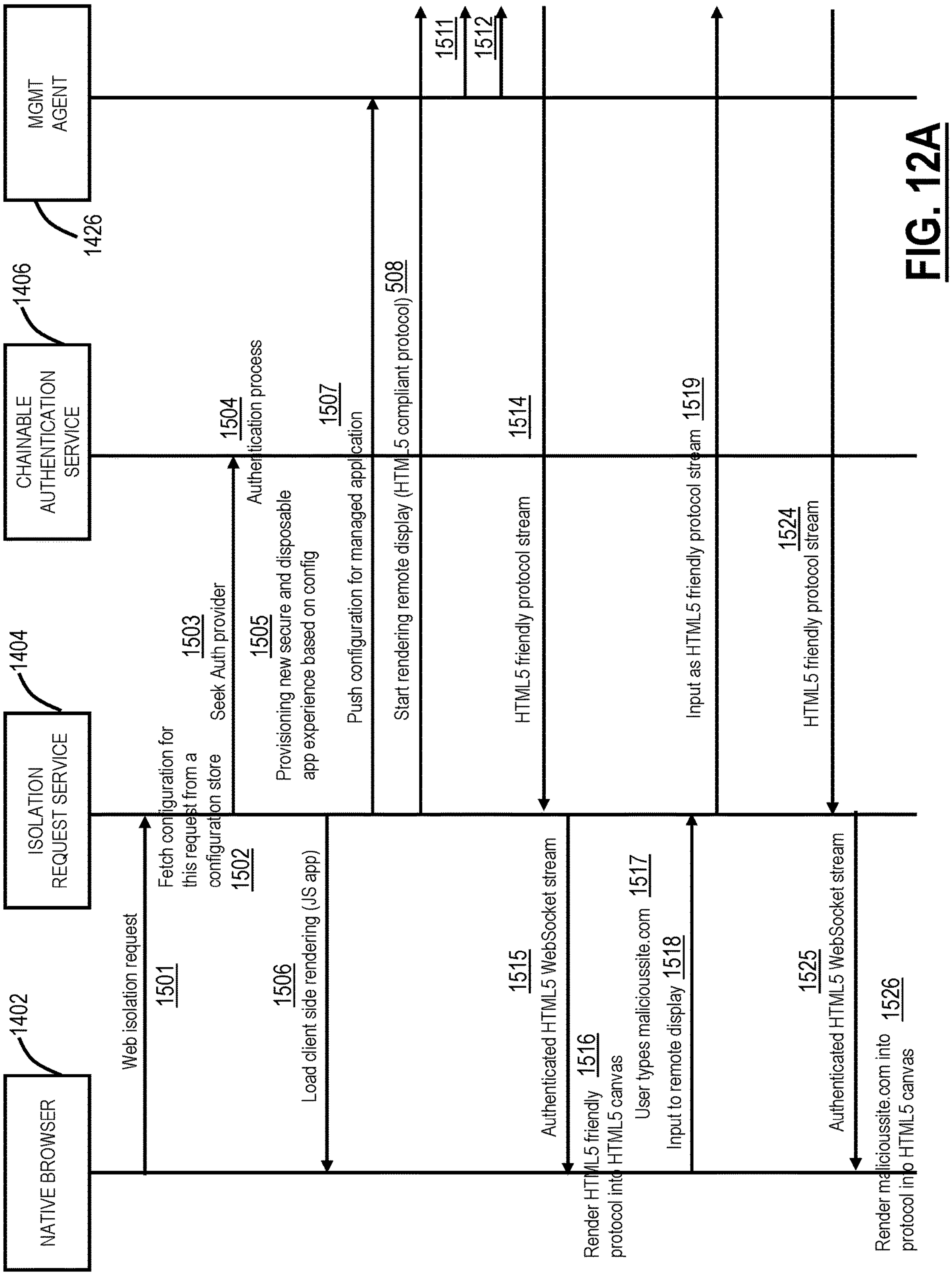
FIGS. 12A-12B are flow diagrams of an example user data persistence flow when a user accesses the secure and disposable application environment.
Figure 12B:
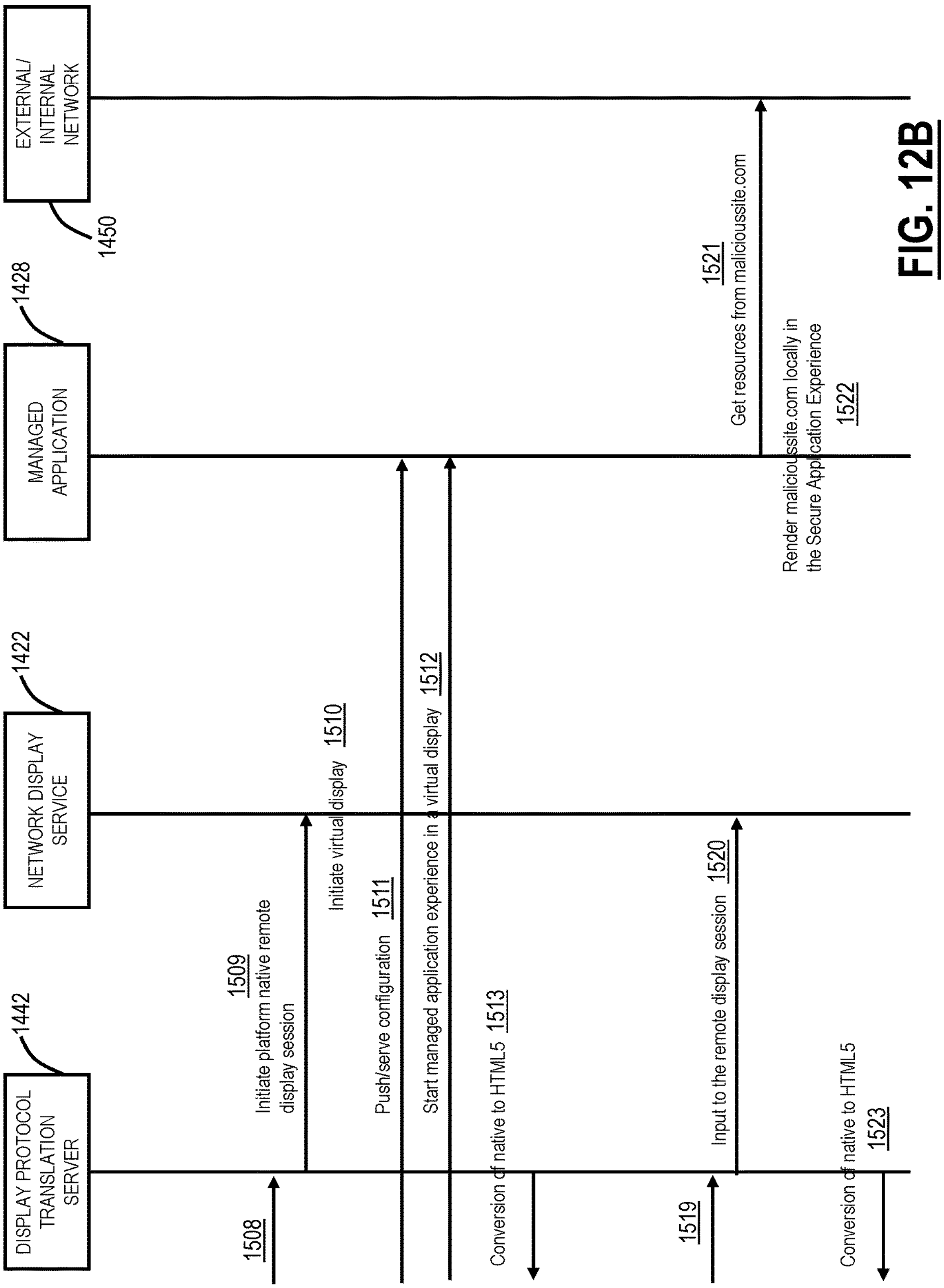

FIGS. 12A-12B are flow diagrams of an example user data persistence flow when a user accesses the secure and disposable application environment 1420. This sequence flow diagram describes the process for persisting certain user and web app related information (cookies, sessions, settings, etc.) during a web isolation session. For example, once a web isolation session has already been initiated (as per the other sequence flows), and that the user, through the native browser 1402, interacts with App1 which is rendered by the managed application 1428 which lives inside the secure and disposable application environment 1420.

The management agent 1426 which sits in the secure and disposable application environment 1420 alongside the managed application 1428 takes a snapshot—at regular intervals or before a logout event of the user—of the cookies and session that the user has created as part of his interaction with App1 in the web isolation session inside the secure and disposable application environment 1420. This snapshot is encrypted and stored into the persistent secured storage 1430, available for future use when necessary.

When the user logs out, the secure and disposable application environment 1420 is typically being destroyed; therefore, any existing cookies or other user-related information of browsing are being destroyed alongside.

At a later date, when the user initiates another web isolation session, by using a different secure and disposable application environment, accesses again App1. The management agent 1426 restores the snapshot of the cookies and other user-related information for App1 from the persistent secured storage 1430 and loads it into the secure and disposable application environment 1420. As a result, the user will interact with App1 using the same cookies and settings from the previous isolation session, therefore, achieving a similar experience to that of a browser that was never closed.

Various operations are now described in an example flow in FIGS. 12A and 12B. The user operates the native browser 1402 on the user device 300, and a web isolation request is sent to the isolation request service 1404 (step 1501). The web isolation request can be direct from the native browser 1402, from an intermediate device such as one of the enforcement nodes 150 as a secure web gateway, etc. The isolation request service 1404 fetches a configuration for the request from the configuration storage 1412 (step 1502). The isolation request service 1404 can seek an authentication provider (step 1503) from the chainable authentication service 1406, which implements an authentication process (step 1504).

Once authenticated, the isolation request service 1404 provisions a new secure and disposable application environment 1420 (step 1505) and client-side rendering is loaded on the native browser 1402 (e.g., a JavaScript application) (step 1506). The isolation request service 1404 pushes a configuration for the managed application 1428 to the management agent 1426 (step 1507). The isolation request service 1404 starts rendering a remote display (such as via an HTML5 compliant protocol) with a display protocol translation server 1442 (step 1508). The display protocol translation server 1442 initiates a platform-native remote display session with the network display server 1422 (step 1509) which initiates a virtual display (step 1510).

The management agent 1426 pushes/serves a configuration to the managed application 1428 (step 1511). The management agent 1426 starts a managed application experience in a virtual display (step 1512). The display protocol translation server 1442 performs conversion of native protocols to HTML5 (step 1513) and sends an HTML5 friendly protocol stream to the isolation request service 1404 (step 1514). The isolation request service 1404 provides an authenticated HTML5 WebSocket stream to the native browser 1402 (step 1515).

At the native browser 1402, the HTML5 WebSocket stream is rendered as an HTML5 friendly protocol into an HTML5 canvas (step 1516). The user types or navigates to malicioussite.com (step 1517), and this is input to the remote display at the isolation request service 1404 (step 1518). The isolation request service 1404 inputs this as an HTML5 friendly protocol stream to the display protocol translation server 1442 (step 1519) which inputs this to the remote display session at the network display service 1422 (step 1520).

The managed application 1428 gets the resources from malicioussite.com (step 1521) and renders the malicioussite.com locally in the secure and disposable application environment 1420 (step 1522). The display protocol translation server 1442 takes the rendered malicioussite.com and converts native to HTML5 (step 1523) for an HTML5 friendly protocol stream to the isolation request service 1404 (step 1524). The isolation request service 1404 provides the HTML5 friendly protocol stream as an authenticated HTML5 WebSocket stream to the native browser 1402 (step 1525). The native browser 1402 renders the malicioussite.com into an HTML5 canvas (step 1526).

Web Isolation Integration with a Secure Web Gateway

Figure 13:
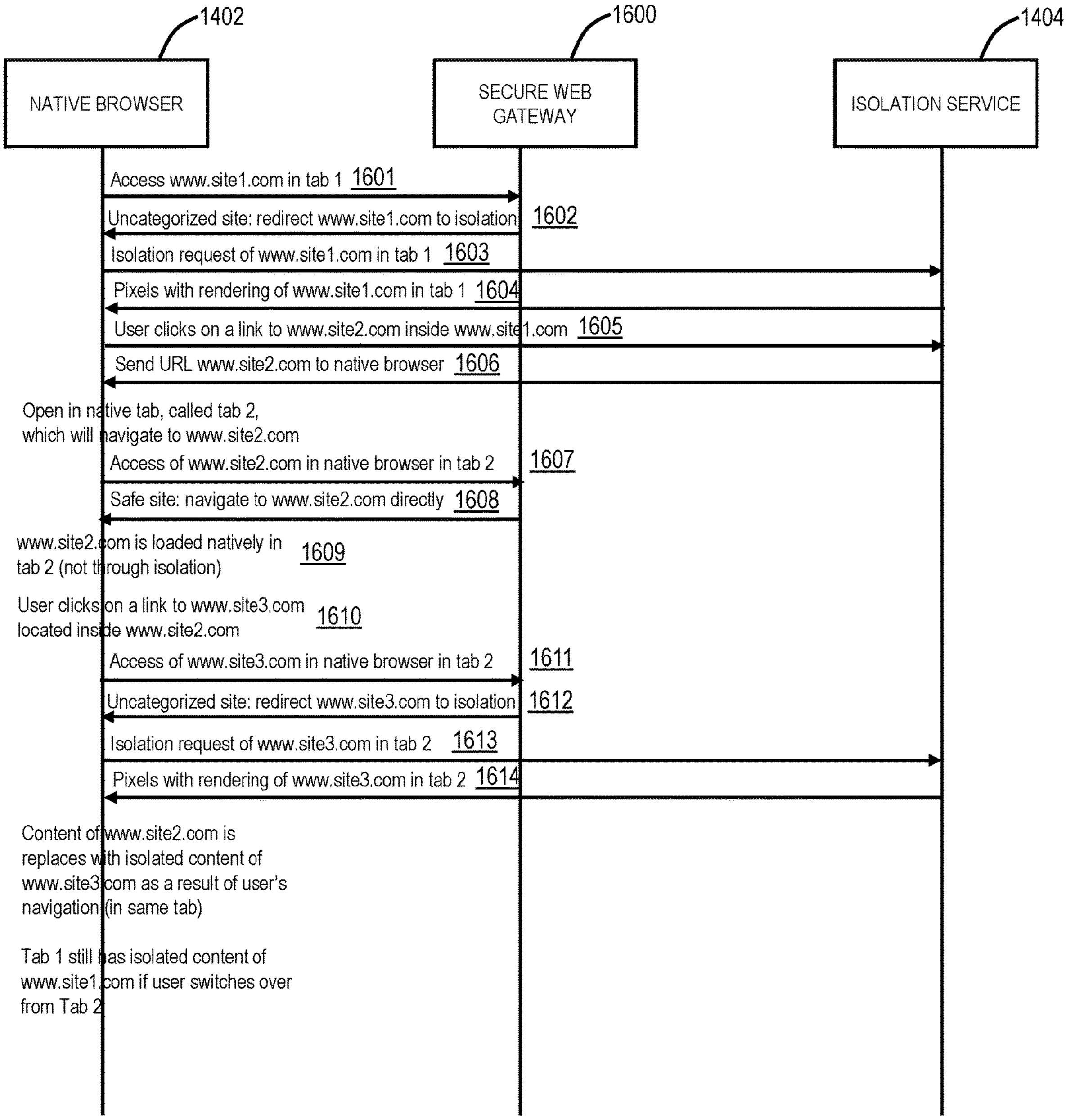
FIG. 13 is a flow diagram of an example of native browser integration with web isolation and a secure web gateway.

FIG. 13 is a flow diagram of an example of native browser integration with web isolation and a secure web gateway 1600. This sequence flow diagram describes the user experience of a user with the native browser 1402 that hits the isolation request service 1404 as a result of his traffic being configured to go through the secure web gateway 1600. The secure web gateway 1600 can be an intelligent proxy that may or may not perform Secure Sockets Layer (SSL) inspection and that works at Layer 7 (e.g., a Hypertext Transfer Protocol (HTTP) proxy, Domain Name System (DNS) proxy, etc.). For example, the secure web gateway 1600 can be one of the enforcement nodes 150. The secure web gateway 1600 can be configured for redirection to the isolation request service 1404 for certain uncategorized sites, e.g., site1.com and site3.com in FIG. 13.

The flow in FIG. 13 starts when a user accesses site1.com in the native browser 1402 such as in a regular browser tab (step 1601). After the evaluation by the secure web gateway 1600, it is decided that site1.com should be rendered in isolation and the user is redirected transparently to the isolation request service 1404 (step 1602) and the native browser 1402 sends an isolation request of site1.com in tab 1 (step 1603). The isolation request service 1404 then renders an isolated version of site1.com in user's native tab (step 1604). As described herein, the isolation request service 1404 sends safe pixels (i.e., graphics) to the native browser 1402, instead of any code associated with site1.com.

The user is now in isolation and can interact with site1.com (i.e., the safe pixels). The user clicks on site2.com, which is a link inside site1.com (step 1605). When the user clicks on site2.com, the managed application 1428 evaluates that it needs to open a new tab, so the URL is sent from the isolation request service 1404 stacks back to the native browser 1402 (step 1606).

The native browser 1402 will open the URL in a new tab, and the request will be re-evaluated by the secure web gateway 1600 (step 1607). The secure web gateway 1600 decides that site2.com is safe and can be rendered directly in the native browser 1402 without isolation (step 1608). At this point in time, the user has 2 tabs open, the first tab with site1.com rendered in isolation and second tab with site2.com rendered directly in the native browser 1402 (step 1609).

The user continues by clicking on a link to site3.com, which is located in site2.com (step 1610). The native browser 1402 computes that this URL does not require opening a new tab, so it tries to navigate directly to it (step 1611). Being under the incidence of the secure web gateway 1600, the native browser 1402 is redirected (step 1612) to an isolation request service 404 since site3.com is an uncategorized site (step 1613). The content of site2.com now is replaced by the content of site3.com in isolation (step 1614).

Application Gating

Figure 14:
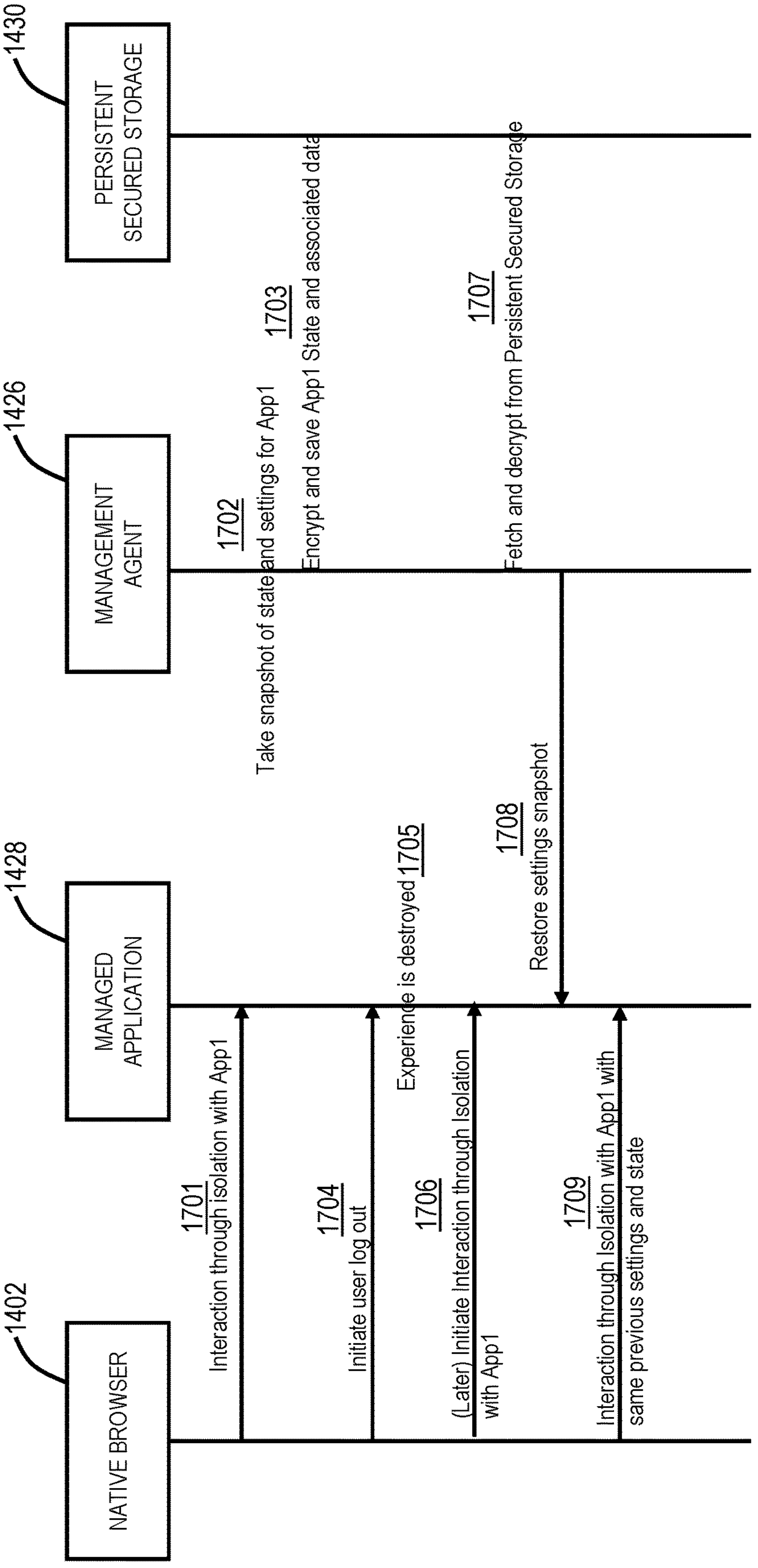
FIG. 14 is a flow diagram of application gating via the secure and disposable application environment.

FIG. 14 is a flow diagram of application gating via the secure and disposable application environment 1420. In addition to rendering uncategorized or malicious content in isolation, the secure and disposable application environment 1420 can be used for "application gating" where applications are presented in isolation, such as to untrusted user device, in order to protect against data exfiltration. This allows users to access sensitive content, but the content remains off the untrusted device, i.e., it is rendered graphically in the secure and disposable application environment 1420 and destroyed once the session ends. FIG. 14 is a sequence flow diagram of a web application that is gated for access from unmanaged, untrusted devices.

The flow starts when the user accesses a generic web application ("App1") such as from the native browser 1402 (step 1701). As described herein, the generic web application can include Office 365, Salesforce, Google Suite, Box, Dropbox, Workday, etc. Another way of accessing the generic web application can be from a Single Sign-On (SSO) application portal, which also acts as an Identity Provider (IdP). The generic web application can be configured to redirect to the chainable authentication service 1406 by the administrator to detect and gate applications in unmanaged endpoints. The chainable authentication service 1406 is configured to check policies for gating and federate authentication requests to the original third-party IdP of the user. After the user is redirected to his third party IdP for authentication, the chainable authentication service 1406 will check policies to see if this application needs to be gated or not. A policy represents a certain criteria that the user's endpoint (i.e., the native browser 1402) needs to meet in order for gating to happen or not. An example of such criteria can be originating IP Address, e.g., the user is remote. Other criteria are also contemplated.

Gating web applications in this context means stopping the authentication flow and completing the final part of it in a web isolation environment; the user's native browser 1402 receives a redirect from the chainable authentication service 1406 to the isolation request service 1404 with context needed to complete the authentication instead of completing the authentication flow to generic web application in the native browser 402. The users' native browser 1402 creates a web isolation session by connecting to the isolation request service 1404.

For example, with app gating, there is a capability to tag/detect endpoint and transparently redirect SaaS apps to isolation using a Security Assertion Markup Language (SAML) proxy.

When the generic web application is gated, access is permitted only through web isolation. The isolation request service 1404 will push the URL of the generic web application to the management agent 1426 which in turn uses it to open the generic web application inside the secure and disposable application environment 1420 (step 1702). The managed application 1428 will now open the generic web application and will render it in isolation. The user will browse the generic web application experience inside isolation thus any content will remain contained in the secure and disposable application environment 1420. During operation, the management agent 1426 can periodically encrypt and save the App1 state and associated data in the persistent secured storage 1430 (step 1703).

At some point, the user can initiate a log out of the App1 (step 1704). As described herein, the secure and disposable application environment 1420 is destroyed (step 1705). Assume, for example, the user later logs back into the App1 session (step 1706). The App1 state and associated data can be fetched and decrypted from the persistent secured storage 1430 (step 1707) and the management agent 1426 can restore the App1 state-based thereon (step 1708). Now, the user can interact with the App1 in isolation with the same previous settings and state (step 1709).

In another embodiment, assume the native browser 1402 does meet the policies enforced by the chainable authentication service 1406 thus the generic web application will not need gating and access to it can be direct without going through isolation. In this scenario, it is being considered that the native browser 1402 is accessing from a trusted, managed endpoint. An example of such a case would be when the user is accessing from a company's corporate network. In this particular case, the policy could be configured to enforce tagging of the endpoint such as that, the chainable authentication service 1406 will generate a cryptographically secure cookie that will be sent to the user's native browser 1402 as part of the responses and will be used as a tagging mechanism to recognize this particular browser in the following future interactions with the chainable authentication service 1406. If the policy is configured so, it could allow accesses to generic web application directly, not through isolation, if the tag (cookie) is present in the request as a mechanism of validation.

Example Web Isolation Session

Figure 15:
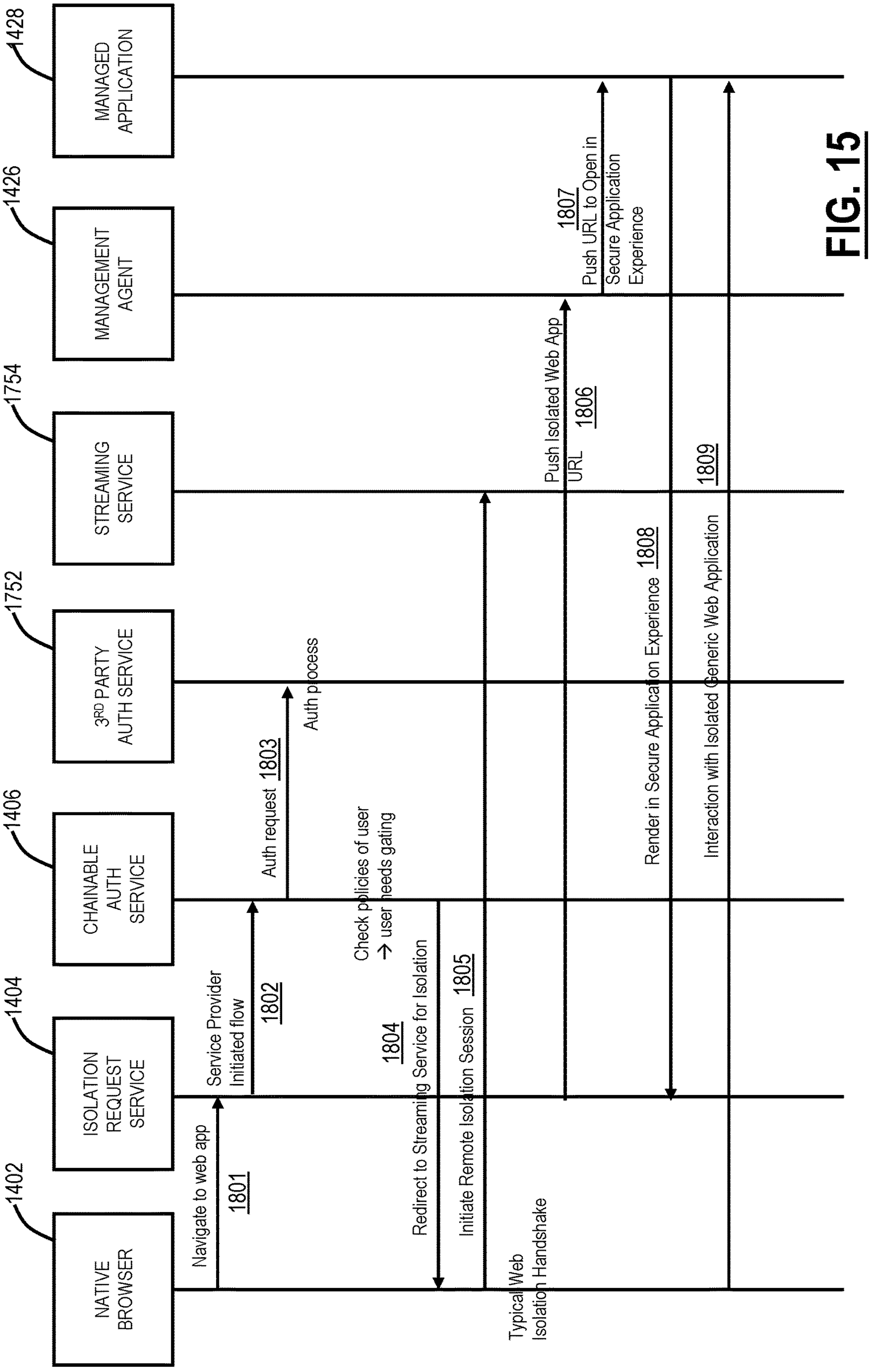
FIG. 15 is a flow diagram of a typical web isolation session for illustration purposes.

FIG. 15 is a flow diagram of a typical web isolation session for illustration purposes. FIG. 15 describes the entities and interaction between them that are used in the process of establishing a web isolation session from the native browser 1402. The web isolation session is an application session where one can render the content of any managed application 1428 and stream back only pixels to the native browser 1402.

In the example of FIG. 15, it is assumed the managed application 1428 is a web browser. The flow starts from the native browser 1402 when an isolation request is being sent to the isolation request service 1404 (step 1801). The isolation request can be sent in multiple ways: either directly if the user wants to access the isolation request service 1404 directly or indirectly through a redirect coming from a third party service that was configured for isolation. The third-party web service can be, for example, the secure web gateway 1600 service that listens for web requests and redirects to the isolation request service 1404 for the URLs that are uncategorized or potentially malicious. Another possibility is that an authentication service (such as the chainable authentication service 1406) is configured based on certain policies to redirect to the isolation request service 1404 (step 1802). The isolation request service 1404 will fetch the configuration for this isolation request from a configuration storage 1412 based on certain attributes from the URL of the isolation request.

After fetching the configuration, it will seek the authentication provider needed to validate the user's credentials to access the isolation request service 1404. Usually, this authentication provider is the chainable authentication service 1406, which based on the configuration for this isolation request, will redirect to the proper third party authentication service 1752 and complete the authentication process for the user by using one or more consequent web requests based on the authentication protocol chosen (step 1803). After the user's credentials have been validated a new secure and disposable application environment 1420 will be allocated to the end-user by the isolation request service 1404 (steps 1804, 1805).

In the same time, a client-side renderer (a JS-based application) will be served to the native browser 1402 which will be in a wait state, waiting for the secure and disposable application environment 1420 to be initialized and fully provisioned. The isolation request service 1404 will push the configuration for this isolation session to the management agent 1426 (step 1806), which pushes the URL to the secure and disposable application environment 1420 (step 1807).

Simultaneously (or right after) the isolation request service 1404 will start a rendering session using an underlying HTML5 compatible protocol by connecting to the display protocol translation server 1442 (step 1808) which in turn will initiate a platform-native display session to the network display server 1422 residing in the secure and disposable application environment 1420. The display protocol translation server 1442 serves as a translator service between native display protocol (such as Remote Desktop Protocol (RDP), for example) and an HTML5 compatible protocol. The network display server 1422 acts as a local bridge between the native virtual display 1424 and the network by translating raw data from the display driver to a network streamable protocol stream.

Using the Configuration received from the isolation request service 1404, the management agent 1426 will now push/present this information to the managed application 1428 residing in the secure and disposable application environment 1420 and will instruct the managed application 1428 to start within a virtual display 1424. Simultaneously with this start of the managed application 1428, a data stream will now be exposed to the network from the virtual display 1424 (on which the managed application 1428 is connected to) through the network display server 1422 and will be in turn transformed by the display protocol translation server 1442 into an HTML5 compatible protocol. The stream reaches back to the isolation request service 404 which instructs the native browser 1402 via the JS application to render the HTML5 compatible protocol into native HTML5 compatible components such as a canvas, using images of various types such as JPG, PNG, or WEBP depending on various factors such as network, frame rate, type of content in the screen etc. The communication for the rendering and streaming between the native browser 1402 and the isolation request service 1404 is now being done over an authenticated HTML5 WebSocket.

The end user via the native browser 1402 has now established a web isolation service which streams back pixels from the managed application 1428. All the clipboard, keys and mouse operation are now being transported via the WebSocket stream through an HTML5 compatible protocol and in turn into a native display protocol stream to the remote display session (step 1809). The reverse of the translation happens when the communication is being done from the native browser 1402 to the managed application 1428.

As the user types inside the web isolation session the URL of a potentially malicious website, the website will be rendered inside the remote web isolation session by the managed application 1428 independent of the native browser 1402. Moreover, via the mechanisms of remote display translations mentioned above the actual representation of the remote virtual display will reach the end user native browser 1402 in the form of an HTML5 compatible stream of pixels.

WebSocket

WebSocket is a protocol, providing full-duplex communication channels over a single Transmission Control Protocol (TCP) connection. The WebSocket protocol was standardized by the IETF as RFC 6455 in 2011, and the WebSocket API in Web IDL is being standardized by the W3C. The present disclosure utilizes the WebSocket protocol for interaction between a web browser (or other client application), such as the native browser 1402, and a web server, such as the isolation request service 1404. This is made possible by providing a standardized way for the server to send content to the client without being first requested by the client and allowing messages to be passed back and forth while keeping the connection open. Most browsers support the WebSocket protocol, including Google Chrome, Microsoft Edge, Internet Explorer, Firefox, Safari, and Opera. The user device can execute a web browser that loads the image content utilizing a JavaScript application and that interacts with the image content by sending keyboard and mouse inputs via a WebSocket channel.

So, the native browser 1402 only has graphics (pixels) but can interact with the graphics using WebSocket. Further, the present disclosure includes a JavaScript layer built on top of a web browser that controls end-user experience (including policies) within the isolated environment.

Browser Isolation Via the Cloud-Based System

Figure 16:
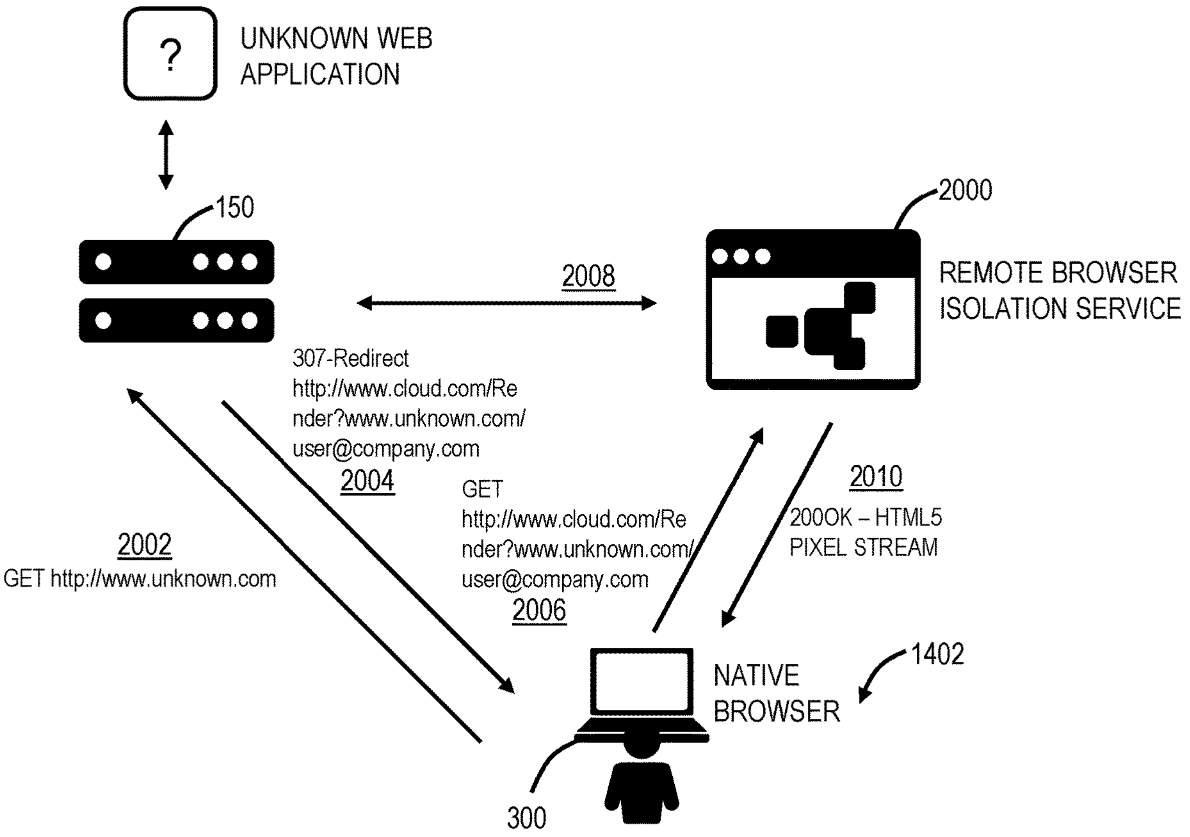
FIG. 16 is a diagram of a typical flow for browser isolation with the cloud-based system.

FIG. 16 is a diagram of a typical flow for browser isolation with the cloud-based system 100. A user with a user device 300 and a native browser 1402 is monitored inline by the cloud-based system 100 via one of the enforcement node 150. The user tries to access an uncategorized website via the enforcement node 150 (step 2002, GET www.unknown.com). For example, the cloud-based system 100 can have a list of allowed websites and blocked websites based on various factors and an uncategorized website is one that is not in the list.

The enforcement node 150 evaluates the request against defined policies, and upon a match, the enforcement node 150 redirects the request to a remote browser isolation service 2000 with the original URL appended as a query string (step 2004). The native browser 1402 follows the redirect and make a connection to a browser isolation endpoint, for the remote browser isolation service 2000 (step 2006). The remote browser isolation service 2000 spins up an isolated browser, such as in a container, and makes a connection to the originally requested webpage (step 2008). Note, this can be direct or via the enforcement node 150.

The isolated browser loads the content including optionally inspecting the content via the cloud-based system 100 (step 2008). Finally, the loaded web content in the isolated browser is streamed to the native browser 1402 as pixels in an HTML5 stream (step 2010).

Private Application Access with Browser Isolation

The present disclosure includes a combination of private application access and browser isolation. This allows users to obtain secure access to the private applications via personal devices (e.g., BYOD) and ensuring an airgap between these unmanaged endpoints and the critical private applications. Use cases can include contractors and BYOD for private applications and data exfiltration control. Use of the ZTNA solution reduces the surface area of attack by a large margin. Some customers also provide access to some of these critical applications to both employees using BYOD and contractors. The problem being, these organization do not really have access or control over the machines/endpoints used by the users to access these applications. The users could essentially be using outdated browsers which have not been patched for ages, vulnerable operating systems, lack of adequate endpoint security or outdated security signatures. These security inadequacies could result in the end machine being compromised and potentially affecting the internal application being accessed by the user. This could also lead to confidential data loss from the internal application.

The ZTNA solution allows organizations to provide access to their private applications using a Zero trust platform. Adhering the basic concepts of Zero trust, this approach has no visibility into what exactly the user does with the application being accessed as the ZTNA solution does not inspect the data being transferred between the user and the application being accessed. This can be problematic when it comes to allowing application access to third party contractors and BYOD devices and not being able to restrict users from performing certain actions against the accessed applications. An example of one such action is that organizations do not want to allow users to download potentially confidential information such as financial records, code snippets, etc. from the private applications down to their personal devices. These personal devices could be shared devices and downloaded files could be left on the devices themselves which could result in information leak and misuse. Organizations would like to create policies where they allow downloads or copying of content from these applications only to their official sanctioned (corporate managed) endpoints and not from BYOD or unsanctioned devices.

Figure 17:
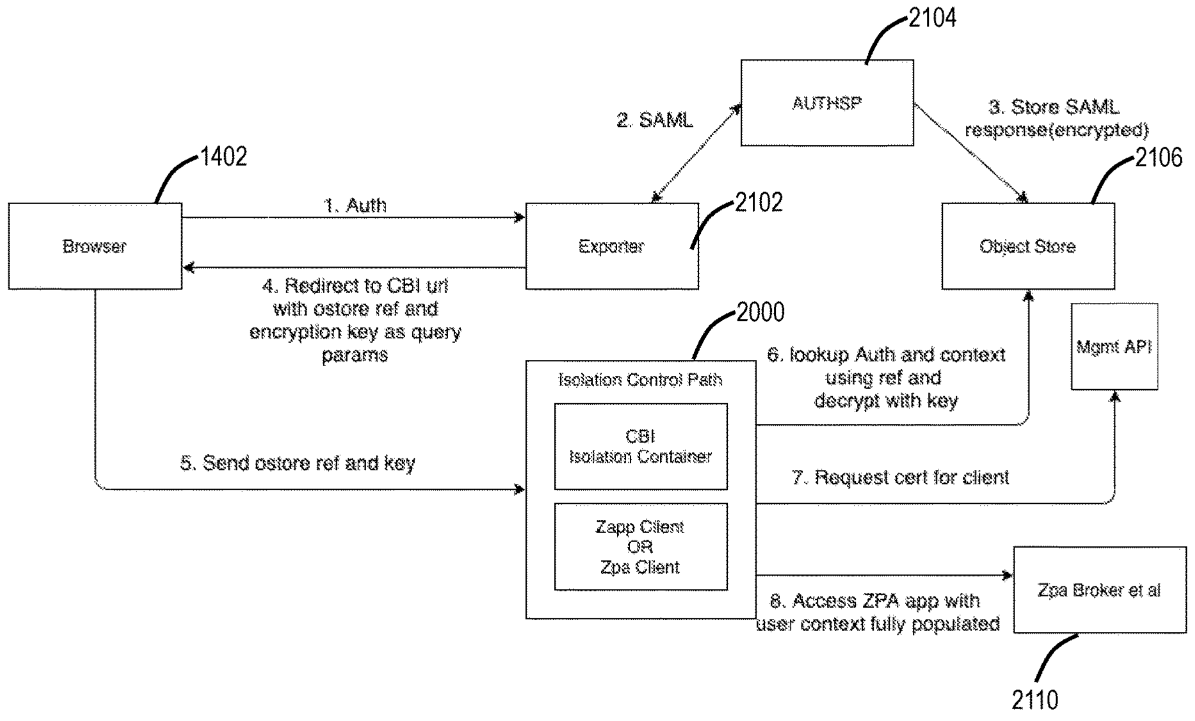
FIG. 17 is a flow diagram of data flow of web isolation with private application access.

FIG. 17 is a flow diagram of data flow of web isolation with private application access. The data flow is described from the browser 1402 which is authenticated (step 1) via an exporter 2102 (part of the cloud-based system 100) that performs SAML with an authentication service provider (AUTHSP) 2104 (step 2) that saves Auth/Context in an object store 2106 (step 3), e.g., the AUTHSP 2104 inserts SAML assertion in the object store encrypted by a randomly generated key. The exporter 2102 redirects the browser 1402 with a query string (step 4). The exporter 2102 does policy evaluation, selects Cloud Browser Isolation (CBI) profile, determines CBI endpoint and redirects with this information.

The browser 1402 sends the object store reference and key to the browser isolation service 2000 (step 5), i.e., a context is sent to the CBI. The context is: object store reference (cookie), decryption key (cryptcookie) and original URL. The CBI profile selected forms part of the CBI domain. The browser isolation service 2000 retrieves a context for the user (step 6) and will use this information to retrieve the full user context from the object store and use the profile to create an isolation container. The browser isolation service 2000 requests a certificate for the customer (step 7), such as via a management API, a central authority node 152, etc. Finally, the browser isolation service 2000 provides access to a private application such as through a broker 2110. The user context with the SAML assertion, etc. is provided to the ZPA client running within the Isolation container which establishes a tunnel to the broker and follows the normal ZPA access workflow.

Application Server Protection

The present disclosure provides systems and methods to protect application servers by detecting and blocking malicious content over file-transfer and clipboard access by maintaining cross-session inspection context. As described herein, several protocols allow users to have remote access to servers. Various examples of these protocols include Secure Shell (SSH), Remote Desktop Protocol (RDP), Virtual Network Computing (VNC), Apache Guacamole, and others known to one of skill in the art. Some of these protocols allow users to copy clipboard contents to the server. Such features can introduce security loopholes in the way the content is copied to the server. These loopholes can be exploited by a user to copy malicious content to a target machine. The various embodiments described herein address these security problems by maintaining user specific session context and utilizing deep packet inspection methods to alert on events and subsequently block such malicious content.

As an example, a user (attacker) can connect to a machine over RDP. This user may want to copy a malware file to the machine. Existing systems may or may not perform full file inspection for security purposes. If full file inspection is supported, this user may attempt to exploit the clipboard access loophole mentioned previously. Further, if the clipboard access supports content inspection and blocks the malicious content, the user can exploit cross-packet signature matching techniques. As an example, consider the following malware file contents.

jjhefhsfawwiwokSIGNATUREdsfsdnknkjslskldnsldsdkl

The contents of such a file can be split into chunks as shown below, where the malware signature is split between two or more of these chunks.

Chunk-1: nkjslskldnsldsdkl
Chunk-2: TUREdsfsdnk
Chunk-3: jjhefhsfaww
Chunk-4: iwokSIGNA In this example, the user splits the malware file into a few chunks where the malware signature "SIGNATURE" is split into separate chunks (i.e., chunk-2 and chunk-4) and copies them out of order. The order of copying the contents to target machine can include using the clipboard feature or file transfer feature, where the user copies chunk-1 in a file on the target machine. The user can then perform a logout/ disconnect from the session. The user is able to then log back in, for example after one or more days, and copy chunk-2 and chunk-3 in the same file at specific offsets in the file to maintain the original order. Again, the user can perform a logout/disconnect from the session and log back in after some time to finally copy chunk-4 to the same file at specific offsets to maintain the original order.

In the above example, even if the system supports content inspection, the user is still able to copy the malware on the target machine. The present systems and methods provide a solution to such security loopholes by storing context entries that are maintained after a session is terminated.

Traditional deep packet inspection (DPI) engines maintain per network flow context while inspecting packet contents. Once flow is terminated (i.e., ending the session), the context is deleted by the DPI engine. In the scenario described above, it is a human-machine interaction which is not like a machine-to-machine interaction over TCP flow. Hence there is a need to preserve the inspection related context across network flows.

The present systems and methods enable maintaining inspection context entries for some time. The time for which the entries are maintained can be configured for any desired duration. For example, the duration that inspection context entries are maintained can be configured to any number of days, weeks, months, etc.

Figure 18:
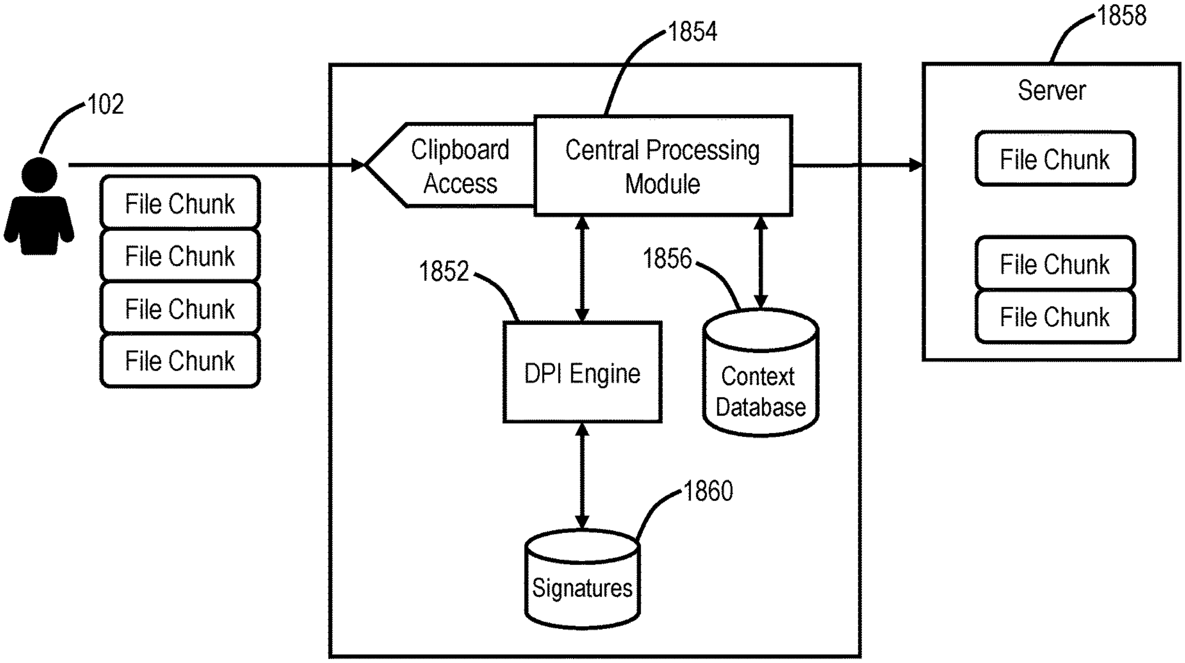
FIG. 18 is a flow diagram of a system for server protection with cross-session inspection context.

FIG. 18 is a flow diagram of a system for server protection with cross-session inspection context. With the present systems and methods in place, when a user 102 performs clipboard access or uploads a file, the contents are sent for inspection to the inspection engine (DPI engine) 1852, i.e., the user traffic is monitored and sent to the DPI engine 1852 for inspection. The DPI engine 1852 is adapted to provide a verdict (label) for the contents. In an embodiment, the verdict can be any of no match, partial match, or full match. The central processing module 1854 acts as a deep learning module that builds the context database 1856 for storing context entries. The deep learning uses matched offsets from the DPI engine 1852. Various embodiments rely on the DPI engine 1852 for signature matching. For example, the engine 1852 capability to detect the match will decide the accuracy of the threat detection. Typical cases, other than splitting files into chunks, include an attacker adding padded data or scramble and reordering the packets while sending it to the target server 1858. In embodiments, the DPI engine 1852 supports TCP streaming and IP-reassembly before regex matching, this helps to provide accurate results. Further a signature database 1860 can be utilized for identifying malicious signatures, or portions of malicious signatures in case of partial match identification.

In the case of a no match verdict, no context is created and stored, and the content is allowed. In response to a full match verdict, the content is treated as a threat, and the content is blocked and an alert is reported. The blocking of content can also include removing the content, or combination of content (chunks), from the server, database, etc. In embodiments, the blocking and alerting can be based on the various policies/rules described herein, and the high level example described in the present section shall be construed as a non-limiting example.

In response to a partial match verdict, a context entry is created to maintain a record for future correlation. Further, in various embodiments, responsive to a partial match verdict, the content can be allowed in addition to creating the context. In order to correlate such context, a per-user hash table can be maintained to uniquely identify users based on tenant, user email, console ID, etc.

Such a context entry can be structured as follows. {[tenant, user-email, console-id], PARTIAL_MATCH, transfer-no, content-offset, content-length, matched signature index, signature-offset, timestamp}. The various components of the present systems are adapted to return a signature ID along with a signature offset in case of a partial match. The various fields in a context entry are further described below.

Tenant: Organization which employs the user.

User-email: User identifier which uniquely identifies the user.

Console-id: Remote session identifier.

File-name: Source file name in case of file transfer. Clipboard in case of clipboard access.

Match-type: Inspection result by deep packet inspection. Any of the NO_MATCH, PARTIAL_MATCH, FULL_MATCH verdicts/labels assigned to the content.

Transfer-no: sequence number to identify the file-transfer or clipboard access event.

Content-offset: In case of PARTIAL/FULL match, starting offset at which signature matched.

Content-length: In case of PARTIAL/FULL match, total number of bytes matched with the signature.

Signature index: Matched signature index in case of PARTIAL/FULL match.

Signature offset: Offset in the signature of the signature-set at which content matched.

Timestamp: time at which content transfer was attempted by the user.

Further, in various embodiments, context entries can be maintained for a period of time. When the next clipboard access or file transfer is attempted by the user, systems check if a previous PARTIAL_MATCH entry exists and send the content to the inspection engine along with previous signature-match and signature offset. The DPI engine provides the verdict in case there is a FULL_MATCH observed. In the case of a full match verdict, the context entry is updated. The entry remains in the database until expiry of the time period.

In case of a FULL_MATCH, the signature ID is used to notify that malware is detected. Such events are recorded. Contents are discarded, and the user will not be able to save the complete malware file on the target machine.

Application Server Protection Process

Figure 19:
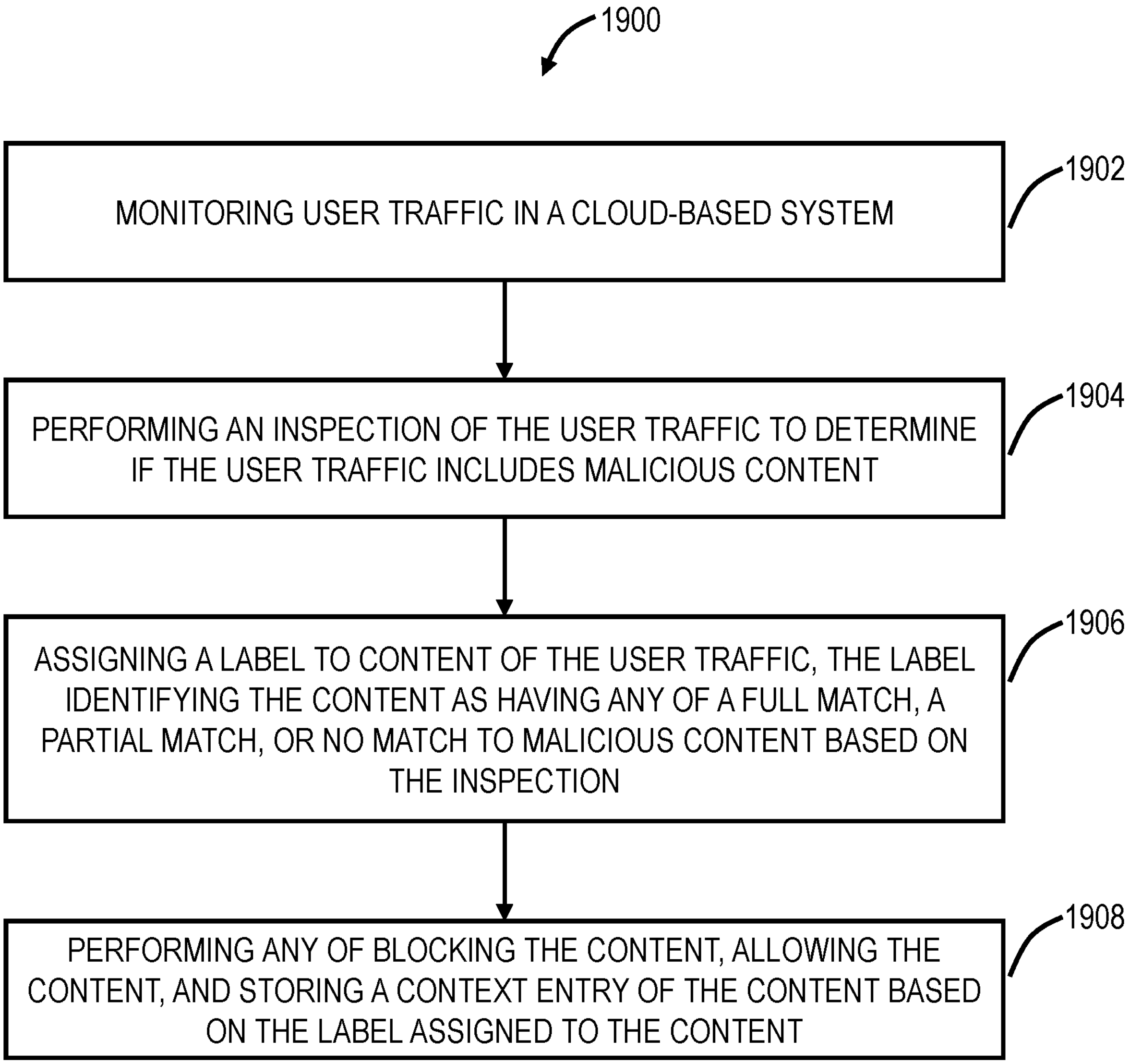
FIG. 19 is a flow chart of a process for server protection.

FIG. 19 is a flow chart of a process 1900 for server protection. The process 1900 includes steps of monitoring user traffic in a cloud-based system (step 1902); performing an inspection of the user traffic to determine if the user traffic includes malicious content (step 1904); assigning a label to content of the user traffic, the label identifying the content as having any of a full match, a partial match, or no match to malicious content based on the inspection (step 1906); and performing any of blocking the content, allowing the content, and storing a context entry of the content based on the label assigned to the content (step 1908).

The inspection can include identifying malicious signatures in the content. The content can include one or more files being transferred to a server over one or more remote access protocols. The context entry can include any of a tenant identity, a user identity, a remote session identifier, and the label associated with the content. The steps can further include storing a context entry of the content in response to a partial match label being assigned to the content, and maintaining the context entry for a period of time. The context entry can be associated with a specific user. The context entry can be maintained after a logout of the user. The context entry can be a first context entry associated with first content, wherein the steps further include monitoring and inspecting user traffic; labeling second content as a partial match to malicious content; and identifying a combination of the first context entry and the second content as malicious. The steps can further include blocking the first content and the second content; and sending an alert notifying the detection of malware. The second content can be monitored during a different session than the first content. In various embodiments, any number of context entries can be combined to identify malicious content.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A method comprising steps of:
- monitoring user traffic associated with a user in a cloud-based system during a first session;
- performing, using an inspection engine, an inspection of the user traffic to determine if the user traffic includes malicious content;
- assigning a label to content of the user traffic, the label identifying the content as having any of a full match, a partial match, or no match to malicious content based on the inspection;
- performing at least one of blocking the content and allowing the content based on the label assigned to the content; and
- in response to the partial match label being assigned to the content, storing a context entry of the content based on the label assigned to the content, wherein the context entry includes a signature identifier and a signature offset associated with the partial match,
- wherein the context entry is maintained for a period of time and, during a subsequent session of the same user, inspected content is sent to the inspection engine along with the signature identifier and the signature offset from the context entry, and the inspection engine provides a full match verdict indicating a full match to a malicious signature based on the inspected content, the signature identifier, and the signature offset.

2. The method of claim 1, wherein the context entry further includes a tenant identity, a user identity, a remote session identifier, and the label associated with the content.

3. The method of claim 1, wherein the period of time is configurable, and wherein the context entry remains in a context database until expiry of the period of time.

4. The method of claim 3, wherein the context entry is associated with the user, and wherein the context entry is maintained after a logout of the user.

5. The method of claim 3, wherein the context entry is a first context entry associated with first content, and the steps further comprise:
- labeling second content as a partial match to the malicious signature during the subsequent session;
- storing a second context entry associated with the second content; and
- determining the full match verdict based on the first context entry and the second context entry.

6. The method of claim 5, wherein the steps further comprise:
- in response to the full match verdict, blocking the first content and the second content; and
- sending an alert notifying detection of malware.

7. The method of claim 5, wherein the second content is monitored during a different session than the first content.

8. The method of claim 5, wherein any number of context entries associated with the same user are combined to identify malicious content.

9. A non-transitory computer-readable medium comprising instructions that, when executed, cause one or more processors to perform steps of:
- monitoring user traffic associated with a user in a cloud-based system during a first session;
- performing, using an inspection engine, an inspection of the user traffic to determine if the user traffic includes malicious content;

assigning a label to content of the user traffic, the label identifying the content as having any of a full match, a partial match, or no match to malicious content based on the inspection;

performing at least one of blocking the content and allowing the content based on the label assigned to the content;

and in response to the partial match label being assigned to the content, storing a context entry of the content based on the label assigned to the content, wherein the context entry includes a signature identifier and a signature offset associated with the partial match, wherein the context entry is maintained for a period of time and, during a subsequent session of the same user, inspected content is sent to the inspection engine along with the signature identifier and the signature offset from the context entry, and the inspection engine provides a full match verdict indicating a full match to a malicious signature based on the inspected content, the signature identifier, and the signature offset.

10. The non-transitory computer-readable medium of claim 9, wherein the context entry further includes a tenant identity, a user identity, a remote session identifier, and the label associated with the content.

11. The non-transitory computer-readable medium of claim 9, wherein the context entry is associated with the user, and wherein the context entry is maintained after a logout of the user.

12. The non-transitory computer-readable medium of claim 11, wherein the context entry is a first context entry associated with first content, and the steps further comprise:

labeling second content as a partial match to the malicious signature during the subsequent session;

storing a second context entry associated with the second content; and determining the full match verdict based on the first context entry and the second context entry.

13. The non-transitory computer-readable medium of claim 12, wherein the steps further comprise:

in response to the full match verdict blocking the first content and the second content; and sending an alert notifying detection of malware.

14. The non-transitory computer-readable medium of claim 12, wherein the second content is monitored during a different session than the first content.

15. The non-transitory computer-readable medium of claim 12, wherein any number of context entries associated with the same user are combined to identify malicious content.

16. The method of claim 1, wherein the steps further comprise checking, during the subsequent session, whether a previously stored context entry associated with a partial match exists for the user before sending the inspected content to the inspection engine with the signature identifier and the signature offset from the context entry.

17. The method of claim 1, wherein the context entry further includes a content offset, a content length, and a timestamp associated with the partial match.

18. The non-transitory computer-readable medium of claim 9, wherein the steps further comprise checking, during the subsequent session, whether a previously stored context entry associated with a partial match exists for the user before sending the inspected content to the inspection engine with the signature identifier and the signature offset from the context entry.

19. The method of claim 17, wherein the content offset identifies a starting offset in the content at which a signature matched, and wherein the signature offset identifies an offset in a signature set at which the content matched.

20. The method of claim 1, wherein the content comprises clipboard contents or one or more files transferred to a server over one or more remote access protocols, and wherein the context entry is maintained after a session is terminated and before the subsequent session is initiated.

* * * * *